US012803840B2

(12) United States Patent
Mouveaux et al.

(10) Patent No.: US 12,803,840 B2
(45) Date of Patent: Nov. 17, 2026

(54) COMMUNICATION NETWORK VISUALIZATION AND NAVIGATION

(71) Applicant: Hewlett Packard Enterprise Development LP, Spring, TX (US)

(72) Inventors: Frederic Mouveaux, Laval (CA); Ronald Mondor, St. Laurent (CA); Guy Letourneau, Boucherville (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 245 days.

(21) Appl. No.: 18/736,213

(22) Filed: Jun. 6, 2024

(65) Prior Publication Data

US 2025/0358146 A1 Nov. 20, 2025

Related U.S. Application Data

(60) Provisional application No. 63/648,048, filed on May 15, 2024.

(51) Int. Cl.
*G06F 3/048* (2013.01)
*H04L 12/42* (2006.01)

(52) U.S. Cl.
CPC .................................... *H04L 12/42* (2013.01)

(58) Field of Classification Search
CPC ....................................................... H04L 12/42
See application file for complete search history.

(56) References Cited

U.S. PATENT DOCUMENTS

| | | | | |
|---|---|---|---|---|
| 6,219,053 B1 * | 4/2001 | Tachibana | G06F 3/0481 | 715/862 |
| 8,185,824 B1 * | 5/2012 | Mitchell | G06F 3/0481 | 715/734 |
| 8,332,782 B1 * | 12/2012 | Chang | H04L 12/6418 | 715/834 |
| 2006/0052998 A1 * | 3/2006 | Michelman | G06F 9/451 | 703/22 |
| 2006/0095865 A1 * | 5/2006 | Rostom | G06F 3/0482 | 715/779 |
| 2015/0363051 A1 | 12/2015 | Yao et al. | | |
| 2015/0363055 A1 | 12/2015 | Katsumata | | |
| 2016/0337204 A1 * | 11/2016 | Dubey | G06F 3/04817 | |
| 2020/0265339 A1 | 8/2020 | Eisenzopf | | |
| 2023/0298769 A1 | 9/2023 | Durkin et al. | | |

* cited by examiner

*Primary Examiner* — Haoshian Shih
(74) *Attorney, Agent, or Firm* — Slater Matsil, LLP

(57) ABSTRACT

In certain implementations, a computer system includes one or more processors and one or more non-transitory computer-readable storage media storing programming for execution by the one or more processors. The programming includes instructions to receive a request for a visualization of a communication network. The communication network includes network devices in a hierarchical arrangement that includes multiple hierarchical levels. The programming further includes instructions to access, in response to the request, network information for the network devices, and to generate, according to the network information, a network visualization of the communication network for display. The network visualization includes a center region and rings arranged in a concentric manner and extending radially from the center region. Each ring at least partially surrounds the center region and includes one or more ring segments that each represent a respective network device.

18 Claims, 15 Drawing Sheets

COMMUNICATION NETWORK VISUALIZATION AND NAVIGATION

CROSS-REFERENCE TO RELATED APPLICATION

This application claims the benefit of U.S. Provisional Application No. 63/648,048, filed on May 15, 2024, which application is incorporated herein by reference.

BACKGROUND

Communication networks are a pervasive and essential part of the daily operations of businesses of all sizes. A communication network may include various electronic devices, such as client devices, access points (APs), gateways, network controllers, routers, and switches, that are able to communicate with one another via one or more communication interfaces. The communication network may be a wired communication network, a wireless communication network, or a combination of wired and wireless communication networks.

BRIEF DESCRIPTION OF THE DRAWINGS

For a more complete understanding of this disclosure, and advantages thereof, reference is now made to the following descriptions taken in conjunction with the accompanying drawings, in which.

DESCRIPTION

Figure 1:
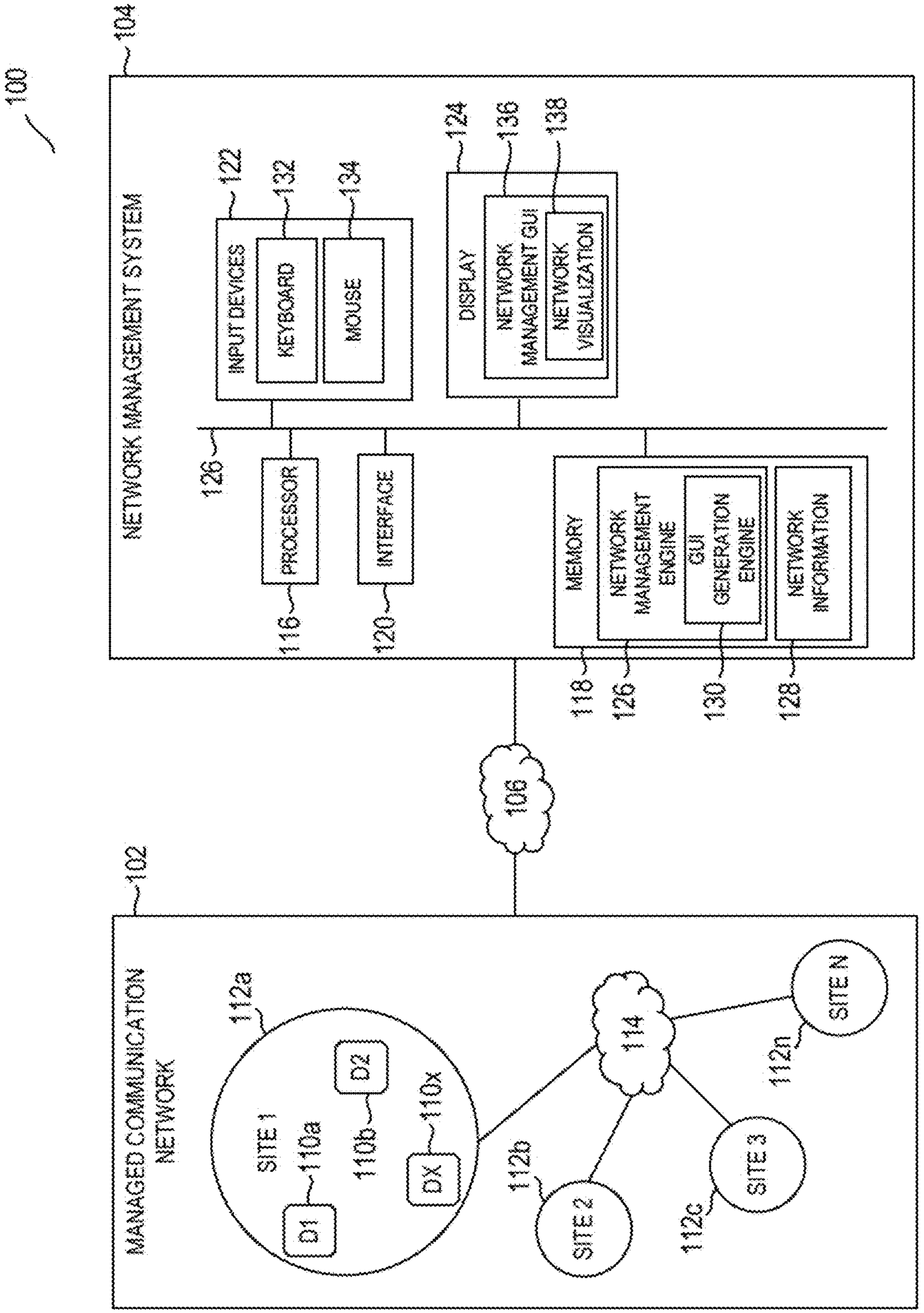
FIG. 1 illustrates an example system for communication network visualization and navigation, according to certain implementations.

A communication network may be monitored using one or more network management systems (NMSs), which may be coupled to network switches, network controllers, and or other network devices. The one or more NMSs may be used to maintain and secure a network. For example, an NMS may manage electronic devices connected to the communication network. Among other operations, the NMS may detect and monitor electronic devices that are coupled to the communication network or otherwise detectable by other electronic devices in the communication network, facilitate identification and troubleshooting of problems with the communication network, and perform other operations. Network information related to the communication network may be aggregated at various points within the communication network and reported to the NMS.

To maintain this critical service, network administrators need to quickly understand, visualize, and react to anomalies arising in the infrastructure. One tool that a network manager may use to manage a communication network is one or more visual representations of the communication network. A network visualization is a tool administrators use to achieve this task. Network visualizations provide a schematic view of how network devices are interconnected and how they relate to one another, including through the use of nodes representing the network devices and links representing connections between the network devices. In addition, by overlaying information on top of the nodes and links, a network diagram provides an at-a-glance graphical representation of the physical topology and allows for visualizing, analyzing, and understanding the status of the network infrastructure.

Communication network infrastructures may be hierarchical. To pinpoint and address problems in the network, administrators may start with a holistic view of the network, and then based on the status of the different interconnections and devices, drill down to pinpoint one or several areas of particular interest and may drill down further to continue troubleshooting.

Due to this hierarchical nature, a network visualization may represent the communication network as a tree structure. Tree structures, however, occupy a large amount of space on a display, especially when dealing with large enterprise networks where the hierarchy of nodes is very deep and/or very wide. That is, tree structures are not optimal when many nodes are present or when the topology is multiple layers deep. Collapsing an entire branch of the tree or combining many nodes together to try to fit more of the tree structure onto the screen obscures portions of the network and makes it difficult to pinpoint and navigate to areas of the communication network. A tree structure quickly reaches the limits of the screen and becomes unreadable, usually requiring significant time to expand the collapsed branches or nodes, interpret the information, and advance to the next step.

Certain implementations of this disclosure provide a network visualization that includes a sunburst diagram, which also may be referred to as a radial tree map or using other terms, representing some or all of a communication network, and that may be generated from network information gathered about the communication network. The communication network may include any suitable numbers and types of electronic processing devices that are capable of wired and/or wireless communication. The network information may include, for example, identifiers of the network devices of the communication network, type identifiers of the network devices of the communication network, topology information (e.g., neighbor information) related to the network devices of the communication network, performance information (e.g., status, load, capacity, etc.) related to the network devices of the communication information, and/or any other suitable information in any suitable combination.

The sunburst diagram may include a center region (e.g., inner circle) and one or more rings arranged in a concentric manner and extending radially from the center region. Each ring at least partially surrounds the center region and includes one or more ring segments. The different hierarchical levels in the hierarchy may be represented by the rings from a reference point or device in the center region. Each ring segment within the rings represents a node in the communication network hierarchy, such as a network device. The ring segment representing a particular network device is positioned in front of (in a ring closer to the center region than) the ring segment representing the device to which the particular device is directly connected. In other words, the direct relationship between a child node and a parent node is clearly indicated by the positioning and proximity of the respective ring segments for the network devices.

In certain implementations, a user (e.g., a network administrator) may navigate between the different network devices and/or categories of network devices of the sunburst diagram by clicking on portions (e.g., ring segments) of the rings within the sunburst diagram. A user (e.g., a network manager) may seek to navigate to a specific device to obtain a clearer view of what is happening on a particular device or the devices under the particular device in the hierarchy. For example, to focus an investigation into a particular network issue, a user may want to filter out all information that does not pertain to the network area at issue. In certain implementations, in response to user selection of a particular ring segment within a ring (which corresponds to a particular device in a particular hierarchical level of the network hierarchy), the system modifies the sunburst diagram to bring the particular device to the center region, allowing the user to focus on the particular device. The system recalculates the sunburst diagram around the new reference point (the particular device now displayed in the center region) and only shows the branch of the network hierarchy under that device.

The sunburst diagram may result in a more compact and interactive visualization of the network topology relative to a traditional tree representation, potentially increasing the amount of the network that can be represented on a display and improving a navigational experience. Certain implementations, include color coding and layering of information for indicating different statuses of the devices, which may provide users with a critical at-a-glance visualization of the different areas affected by issues in the entire network. In certain implementations, the system supports general user interaction to allow zooming and repositioning of the sunburst diagram on the screen, and to allow the visualization of the information at a high level (revealing more levels on the screen) or to pinpoint a specific network area.

In certain implementations, the center region of the sunburst diagram can offer a visualization of the network connectivity path from the device up the hierarchy, which may allow for quickly navigating up the network connectivity path to another device in the reference device's network connectivity path or to the top of the network hierarchy. For example, certain implementations may include displaying an opening extending from the center region entirely through the one or more rings of the sunburst diagram, displaying information regarding a currently-selected device in the center region, and displaying a network connectivity path to the network device from the center region and at least partially into the opening. The network devices in the displayed network connectivity path may be selectable, and selection of a particular network device in the displayed network connectivity path may cause the sunburst diagram to be modified such that the center region displays the particular network device, and the previous currently-selected network device is moved to a suitable ring of the one or more rings that surround the center region.

Certain implementations may provide one or more technical advantages. Certain implementations provide a visualization of a potentially large network infrastructure that uses a limited display area more efficiently. Certain implementations provide a zoomable sunburst diagram for representing and navigating a network infrastructure. Certain implementations maximize and optimize screen space to provide an at-a-glance view of many (and possibly all) network devices in the communication network. Certain implementations assist a network administrator (or other user) to intuitively find the cause of a network issue, as an entire affected area of the communication network may be highlighted in the sunburst diagram. Certain implementations help a network administrator (or other user) to efficiently navigate to a specific network device, potentially bypassing one or more hierarchical levels in the network hierarchy, if appropriate. Certain implementations may provide better information density to show different aspects of a communication network by coloring (or otherwise distinguishing) network devices and/or using optional information layers. Some or all of these advantages may help a network administrator (or other user) more efficiently manage the represented communication network, including potentially troubleshoot problems associated with the communication network, which may improve operation of the communication network.

Turning to the figures, FIG. 1 illustrates an example system 100 for communication network visualization and navigation, according to certain implementations. In the illustrated example, system 100 includes a managed communication network 102, a network management system 104, and communication network 106. Although a particular implementation of system 100 is illustrated and described, this disclosure contemplates any suitable implementation of system 100.

In general, network management system 104 is configured to obtain network information related to managed communication network 102, which may include network devices in a hierarchical arrangement. Network management system 104 may provide a GUI that includes information about managed communication network 102. In particular, network management system 104 is configured to generate a GUI that includes a network visualization of at least a portion of managed communication network 102, and that network visualization may be a so-called sunburst diagram. These and other details are described in greater detail below.

Managed communication network 102 may include one or more electronic communication networks. Managed communication network 102 may include one or more network devices, referred to generally as network devices 110 (network devices 110*a*-110*x* of site 1, described below) are shown). Network devices 110 may include any suitable combination of client devices, APs, gateways, controllers, routers, switches, and/or other suitable network devices that are able to communicate with one another via one or more communication interfaces. Although FIG. 1 shows managed communication network 102 to include particular numbers of network devices 110, managed communication network 102 may include any suitable number of network devices 110.

Managed communication network 102 may be located at one facility or may span multiple facilities, and may be located at one general geographic location or may span multiple geographic locations. To that end, managed communication network 102 may include one or more sites 112*a*-112*n*, which may be referred to generally as sites 112. Each site 112 may include one or more network devices 110 of managed communication network 102. To avoid overcrowding FIG. 1, only site 112*a* is shown to include network devices 110 (e.g., network devices 110*a* through 110*x*); however, each site 112 may include one or more network devices 110. Sites 112 may be communicatively coupled via a communication network 114. Communication network 114 is described in greater detail below in association with communication network 106.

Network devices 110 may be dispersed throughout a physical environment (e.g., throughout a facility or campus) of a site 112 to provide connectivity to other network devices 110 (e.g., client devices) and/or connect to a communication network. This disclosure contemplates the physical environment of a site 112 in which network devices 110 are dispersed being one or multiple geographic locations. Network devices 110 may be spaced apart in two or more dimensions. For example, a particular site 112 may be a business facility, and at least some of network devices 110 may be dispersed throughout the business facility to provide other network devices (e.g., client devices) with network access to other network devices 110 of managed communication network 102 and/or to other communication networks (e.g., to the Internet).

In certain implementations, sites 112 correspond to different geographic locations; however, this disclosure is not limited to those implementations. As an example, managed communication network 102 may correspond to the entire communication network of a company and each site 112 may correspond to offices of the company that are located in different cities or geographic locations within a same city or region. As another example, some or all of sites 112 may correspond to different floors in a building and/or to different buildings on a campus of an entity (e.g., a company, university, or other suitable entity). Other implementations are possible.

This disclosure contemplates managed communication network 102 including any suitable number and types of network devices 110. Additionally, this disclosure contemplates managed communication network 102 including any suitable number of sites 112. In other words, this disclosure contemplates network devices 110 of managed communication network 102 being organized into any suitable number of sites 112, including a single site 112 or multiple sites 112.

Network devices 110 may include any suitable combination of hardware, firmware, and software, which may cooperate to provide the features of a network devices 110. Network devices 110 may be configured to provide certain network information to one or more other devices of system 100. For example, network devices 110 may provide network information to network management system 104, directly or potentially indirectly through one or more other network devices 110 that are configured to provide the network information to network management system 104. The contents of the network information (some or all of which may be provided by network devices 110) are described in greater detail below but may include information useful to network management system 104 for generating and facilitating navigation of a network management GUI for managing network devices 110. Network management system 104 may collect the network information for a variety of purposes associated with managing managed communication network 102.

Turning to network management system 104, network management system 104 may be configured to control a portion or all of managed communication network 102, including some or all of network devices 110 across sites 112. For example, network management system 104 may be a central point of control that is accessible by the administrators of managed communication network 102. Network management system 104 may be configured to provide an interface for controlling and otherwise managing managed communication network 102.

Network management system 104 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, wireless data port, personal digital assistant (PDA), one or more Internet Protocol (IP) telephones, one or more cellular/smart phones one or more servers, a server pool, one or more processors within these or other devices, or any other suitable processing device. Network management system 104 may be a stand-alone computer or may be a part of a larger network of computers associated with an entity.

In certain implementations, network management system 104 may include one or more processors 116, one or more memories 118, one or more interfaces 120, one or more input devices 122, one or more displays 124 (and/or other suitable output devices); and one or more links 125, some of which may be referred to throughout the remainder of this disclosure in the singular for simplicity. Network management system 104 may be implemented using any suitable combination of hardware, firmware, and software.

Processor 116 may include one or more programmable logic devices, microprocessors, application-specific integrated circuits (ASICs), controllers, or any other suitable computing devices or resources or any combination of the preceding. Processor 116 may work, either alone or with other components of network management system 104, to provide a portion or all of the functionality of network management system 104.

Memory 118 may take the form of volatile or non-volatile local or remote devices capable of storing information, including magnetic media, optical media, random-access memory (RAM), read-only memory (ROM), removable media, or any other suitable memory device. In the illustrated example, memory 118 stores network management engine 126 and network information 128. Each of these is described in greater detail below.

Network management engine 126 may include programming for execution by processor 116, the programming including instructions to perform some or all of the functionality of network management system 104. For example, network management engine 126 may include the logic that allows network management system 104 to perform its associated operations, including those related to managing managed communication network 102.

Network management engine 126 may include a GUI generation engine 130. GUI generation engine 130 may include programming for execution by processor 116, the programming including instructions to perform some or all of the functionality of generating a network management GUI (e.g., network management GUI 136, including network visualization 138, described below) and managing interaction with the network management GUI. Network management engine and GUI generation engine 130 may be implemented using any suitable combination of hardware, firmware, and software.

Network information 128 may include information about managed communication network 102. For example, network information 128 may include network topology information, network performance information, and/or any other suitable information. As particular examples, network information 128 may include identifiers of network devices 110, neighbor information for network devices 110, distance information for network devices 110, traffic/load information for network devices 110, and/or any other suitable information. In certain implementations, network information 128 includes information for determining the hierarchical arrangement of network devices 110 and other elements of managed communication network 102.

Network management system 104 (e.g., network management engine 126) may store network information 128, which network management system 104 (e.g., network management engine 126) may receive from components of managed communication network 102 or otherwise determine from information received from components of managed communication network 102. For example, network management system 104 (e.g., network management engine 126) may receive some or all of network information 128 from network devices 110 and/or other components of managed communication network 102. Network information 128 may be stored in any suitable format.

Network management system 104 (e.g., network management engine 126) may use network information 128 to identify sites 112 of managed communication network 102, identify network devices 110 of managed communication network 102, determine a hierarchical relationship of network devices 110, determine network traffic and/or network load of managed communication network 102, and/or for any other suitable purpose. Some or all of network information 128 may be used to generate a network management GUI that includes a network visualization in accordance with this disclosure.

Network information 128 may include information that is organized into, or that can be organized into, one or more information layers for presentation as part of a network visualization (e.g., network visualization 138, described below). For example, network information 128 may include varying layers of information that may be selected for display as part of the network visualization. Network information 128 may include information at a device layer (e.g., network devices 110), a network layer, a link layer, and/or at any other suitable layer elements of managed communication network 102.

At a device level, network information 128 may include information related to the health of network devices 110, the types of network devices 110, the fabric role of network devices 110, and/or other suitable attributes of network devices 110. In certain implementations, the health of network devices 110 may be characterized as Good, Fair, or Poor. In certain implementations, the device type of a network device 110 may be one or more of AP, Switch, Gateway, Unknown, and/or any other suitable device type. In certain implementations, the device fabric role of a network device 110 may be characterized as Edge, Aggregate, Core, Stub, Border, and/or any other suitable role.

At a network level, network information 128 may include information related to the network details for each network device 110. Example network information may include virtual local area network (VLAN) information, spanning tree protocol (STP) domain information, open shortest path first (OSPF) information, and border gateway protocol (BGP) information. For each of these types of network information 128, the information may indicate whether the network type is present, not present, or unknown.

At a link level, network information 128 may include information indicating whether issues exist with a link between network devices 110. Link issues may fall into one or more categories, such as major issues (with an associated status of poor) or minor issues (with an associated status of fair).

Interface 120 represents any suitable computer element that can facilitate, among other possible operations, receiving information from communication network 106 and/or transmitting information through communication network 106. For example, interface 120 may transmit requests for network information 128 (if applicable) to managed communication network 102 and receive network information 128 from managed communication network 102. Interface 120 represents any port or connection, real or virtual, including any suitable combination of hardware, firmware, and software, including protocol conversion and data processing capabilities, to communicate wired and/or wireless traffic through a local area network (LAN), wide area network (WAN), or other communication system that allows network management system 104 to exchange information with other components of system 100.

Input devices 122 may include a keyboard 132 and mouse 134. Of course, network management system 104 may include other input devices, such as a microphone and/or trackpad. Display 124 is an output device for visually presenting information to a user and/or receiving commands from a user.

Network management engine 126 (e.g., GUI generation engine 130) may generate a network management GUI 136 for visual presentation and/or interaction using display 142. Network management GUI 136 may be presented as part of a standalone application, a web page/web application (e.g., via a browser), or in any other suitable manner. In the illustrated example, network management engine 126, and in particular GUI generation engine 130, may generate network management GUI 136. A user of network management system 104 may access and interact with network management GUI 136 to manage managed communication network 102.

Network management engine 126 may receive commands via network management GUI 136 and display output via network management GUI 136. Although described primarily as a GUI, this disclosure contemplates some or all of network management GUI 136 include any suitable combination of a command line interface, a GUI, a web interface, and/or other suitable interface types. Network management engine 126 may process commands from network management GUI 136, validate the commands, and execute logic specified by the commands. Further, network management engine 126 may output the results of commands via network management GUI 136. An administrator may access network management engine 126 using network management GUI 136.

At least a portion of network management GUI 136 may include a network visualization 138. Network management engine 126 (e.g., GUI generation engine 130) may access network information 128 and generate network management GUI 136, including network visualization 138, according to network information 128. For example, network management GUI 136 may provide an option for a network visualization 138, and in response to a request from a user of network management system 104 (e.g., received via network management GUI 136), network management engine 126 (e.g., GUI generation engine 130) may access network information 128 and generate network visualization 138 according to network information 128.

Network visualization 138 represents managed communication network 102 using a sunburst diagram. In certain implementations, network visualization 138 includes a center region and one or more rings arranged in a concentric manner and extending radially from the center region. The center region corresponds to a current-selected and/or default node (e.g., network device 110) in the hierarchical arrangement of managed communication network 102. Each ring at least partially surrounds the center region and includes one or more ring segments that each represent a respective network node of the hierarchical arrangement of managed communication network 102. Additional details regarding an example network visualization 138 are described below with reference to FIGS. 3A-3C.

Link 125 may include any suitable wired or wireless communication medium for the components of network management system 104 to communicate with one another. For example, link 125 may include any suitable combination of a bus or communication network.

Network management system 104 may communicate with components of managed communication network 102 via communication network 106. Communication network 106 and communication network 114 (of managed communication network 102) may facilitate wired and/or wireless communication. Communication network 106 and communication network 114 may communicate, for example, IP packets, Frame Relay frames, ATM cells, voice, video, data, and other suitable information between network addresses. Communication network 106 may include any suitable combination of one or more local area networks (LANs), radio access networks (RANs), metropolitan area networks (MANs), wide area networks (WANs), mobile networks (e.g., using WiMax (802.16), WiFi (802.11), 3G, 4G, 5G, or any other suitable wireless technologies in any suitable combination), all or a portion of the global communication network known as the Internet, and/or any other communication system or systems at one or more locations, any of which may be any suitable combination of wireless and wired. Communication network 106 and communication network 114 may include controllers, APs, switches, routers, or the like for forwarding traffic between network management system 104 and managed communication network 102. In certain implementations, at least a portion of communication network 106 communication network 114 may be an Ethernet network.

Although illustrated separately, communication network 106 and communication network 114 may be considered the same or different communication networks. In certain implementations, communication network 106 could be considered a public communication network while communication network 114 is considered a private communication network such as may be associated with an entity to which managed communication network 102 corresponds. Other implementations are possible.

In operation of an example of system 100, network management system 104 (e.g., network management engine 126 and/or GUI generation engine 130) may perform certain operations to facilitate accessing network information 128 and generating a network management GUI 136 and/or network visualization 138. The network visualization 138 may be a sunburst diagram. Network management system 104 (e.g., network management engine 126 and/or GUI generation engine 130) may perform certain operations to facilitate navigating network management GUI 136 and/or network visualization 138 (e.g., a sunburst diagram). These and other details are described in greater detail below.

While FIG. 1 illustrates a particular configuration of components, this disclosure contemplates other suitable configurations. For example, although FIG. 1 shows certain components as being part of the same device, any of the components may be grouped in sets of one or more components which may exist and execute as part of any number of separate and operatively connected devices. As another example, a single component may be configured to perform all or any portion of the functionality performed by the components shown in FIG. 1. Accordingly, implementations disclosed herein should not be limited to the configuration of components shown in FIG. 1.

Figure 2:
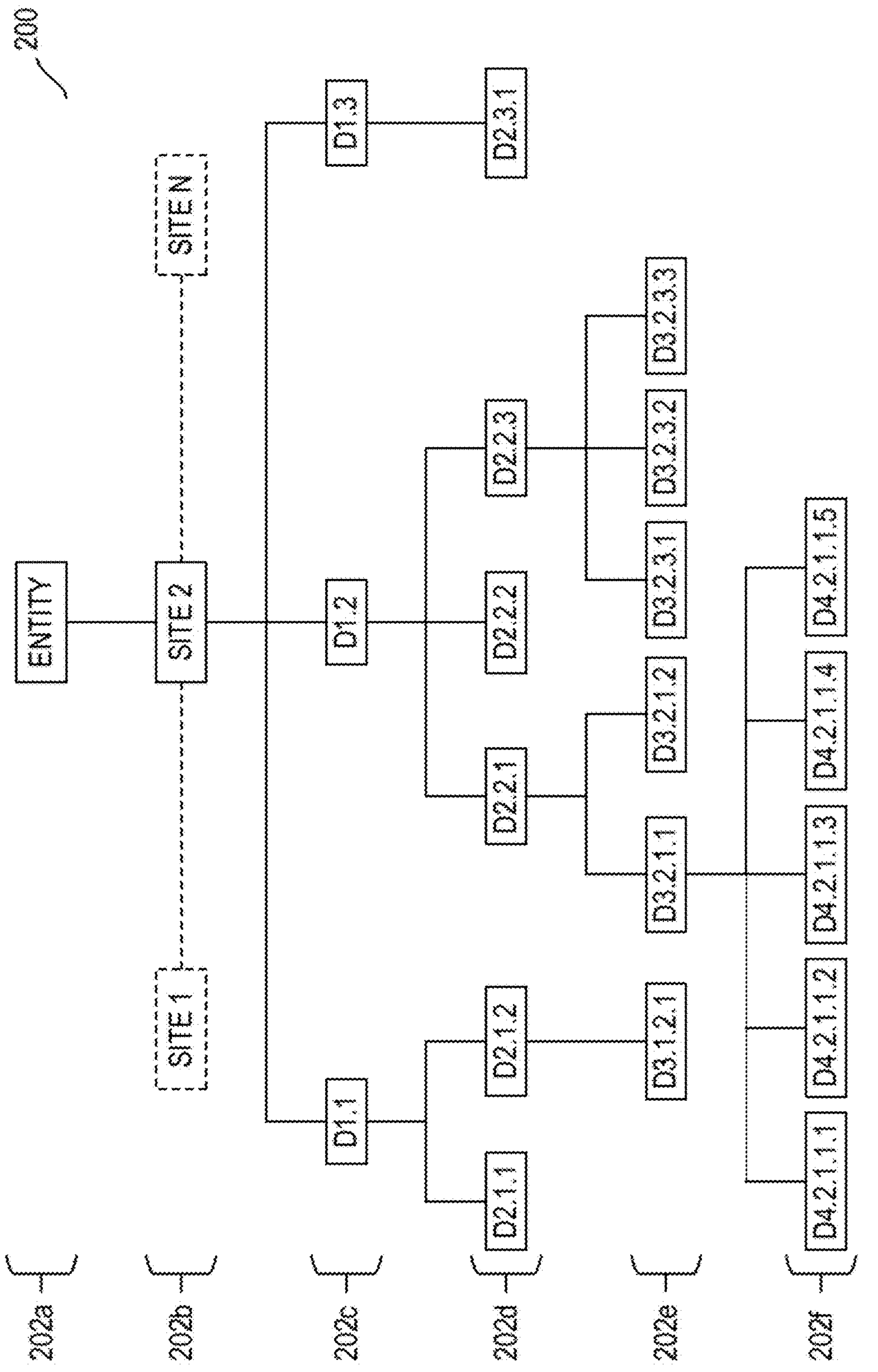
FIG. 2 illustrates an example network hierarchy represented as a tree structure, according to certain implementations.

FIG. 2 illustrates an example hierarchy 200 for a communication network, according to certain implementations. Hierarchy 200 is a tree structure that represents an arrangement of elements of a communication network. For example, hierarchy 200 could represent a relationship among elements, including the network devices 110, of managed communication network 102 of FIG. 1 in an example. Throughout the description of hierarchy 200, reference may be made to aspects of FIG. 1, including particularly to managed communication network 102. It should be understood that reference to particular elements (e.g., sites 112, devices 110, etc.) in FIGS. 1 and 2 do not necessarily have any correlation to one another in terms of hierarchical arrangement.

Continuing with FIG. 2, hierarchy 200 includes multiple hierarchical levels **202*a*-202*f*, which may be referred to generally as hierarchical levels 202. Although hierarchy 200 is shown to include a particular number of hierarchical levels 202, this disclosure contemplates a hierarchy for a communication network including any suitable number of hierarchical levels. Each hierarchical level 202 includes one or more nodes, which correspond to elements of managed communication network 102. For example, a node of hierarchy 200 may correspond to an entity (e.g., a company or other suitable entity), a site 112, a network device 110, or any other suitable element of managed communication network 102**.

In the example of FIG. 2, a top-most hierarchical level **202*a* represents the root of the hierarchy and includes a single root node. In this example, the root node corresponds to the entity (e.g., the company) for which managed communication network 102 is being managed. A next hierarchical level 202*b* may correspond to one or more sites (e.g., locations) of the entity and at which elements (e.g., network devices 110) of managed communication network 102 are located. Each further hierarchical level 202*c* through 202*f* may correspond to network devices that are being managed. Nodes of hierarchy 200** that have no descendants may be referred to as leaf nodes.

Hierarchy 200 represents a relatively simplistic communication network with a small number of hierarchical levels 202 and a small number of nodes (e.g., sites, network devices 110, etc.). It is easy to imagine how, as a communication network grows larger and/or more complex (e.g., more devices and/or more hierarchical levels), hierarchy 200 could become unwieldy. In particular, displaying and interacting with such a hierarchy using a tree structure displayed on a screen may be difficult and/or inefficient.

Figure 3A:
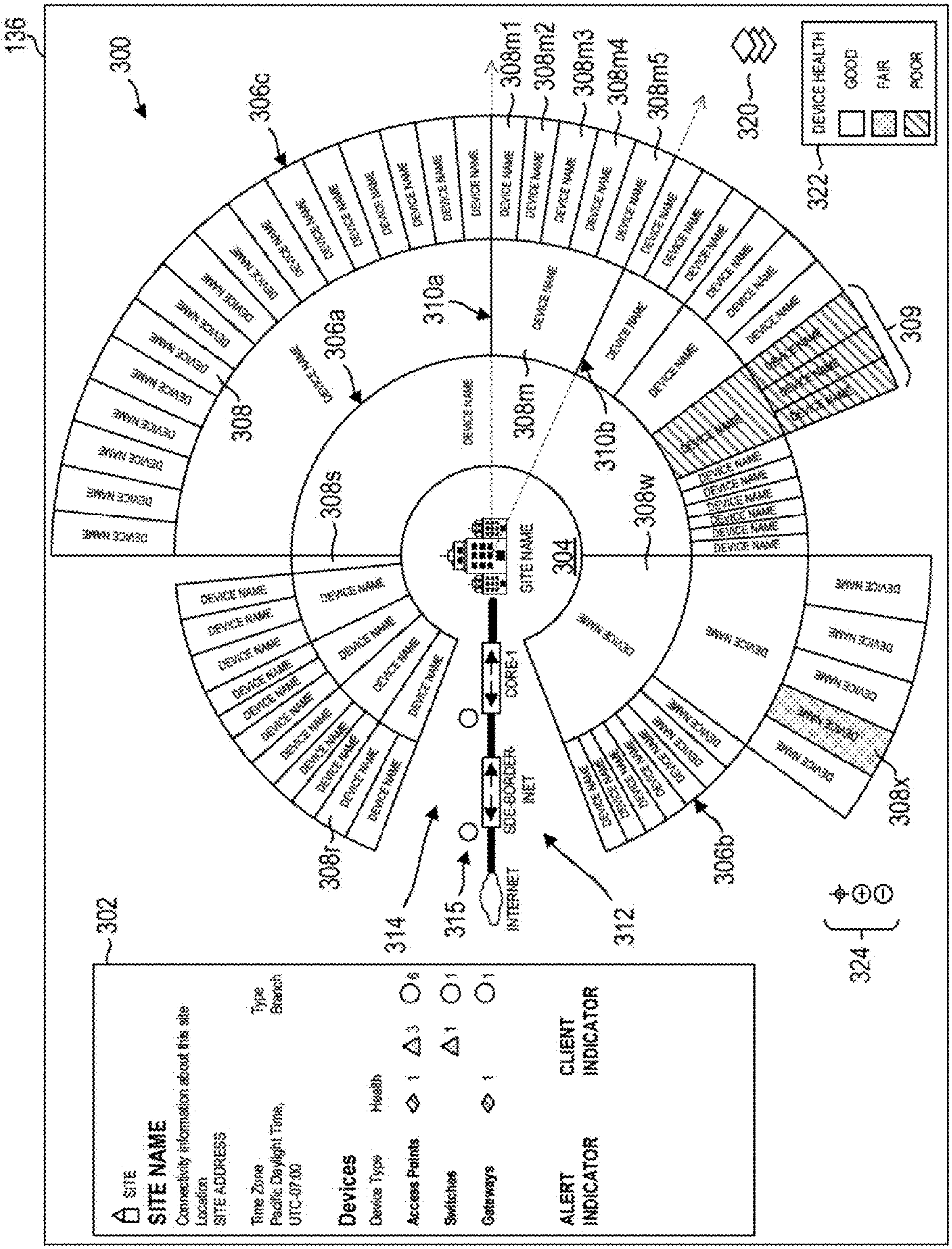
FIGS. 3A-3C illustrate an example network management graphical user interface (GUI) that includes a sunburst diagram at various stages of interaction, according to certain implementations.
Figure 3B:
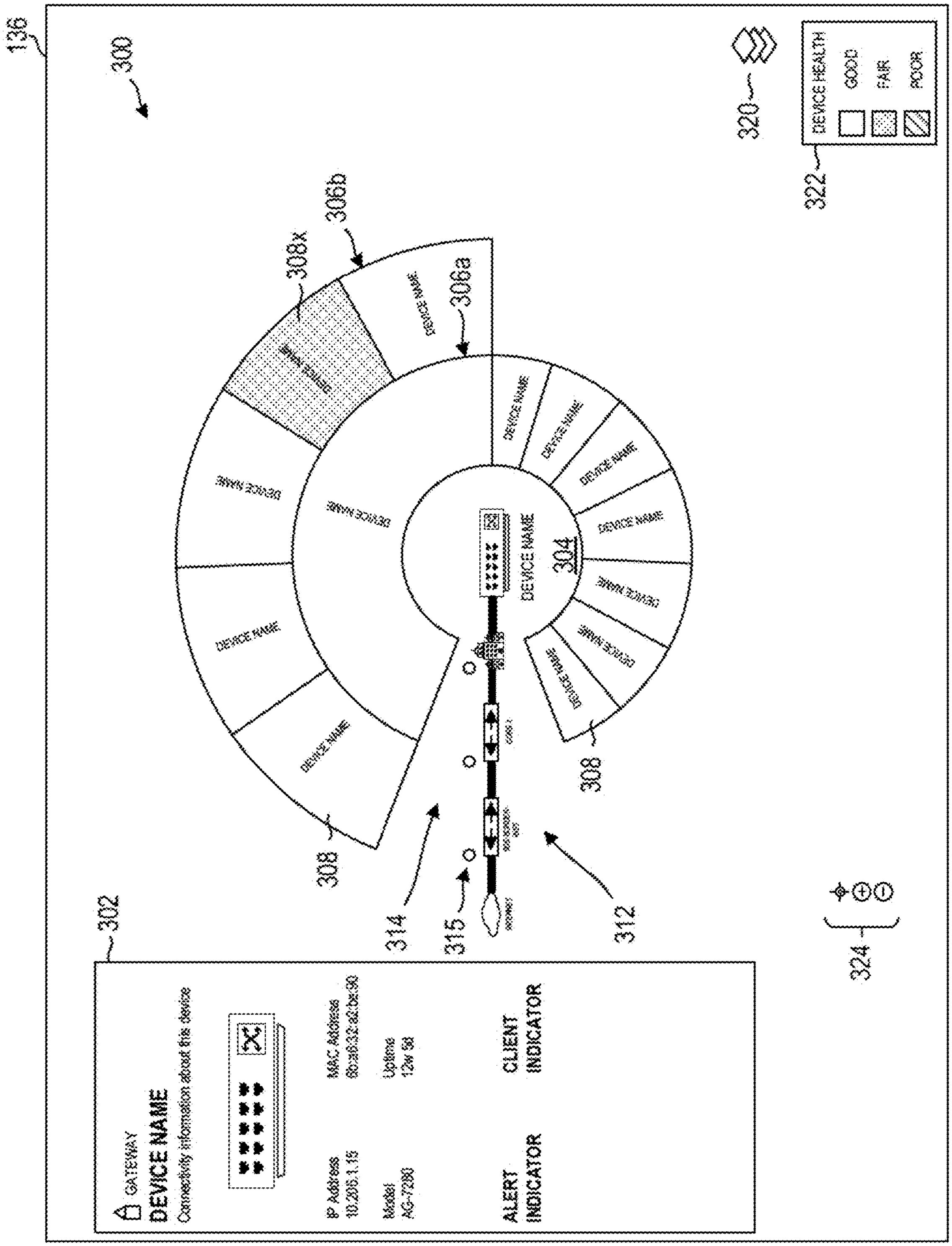
Figure 3C:
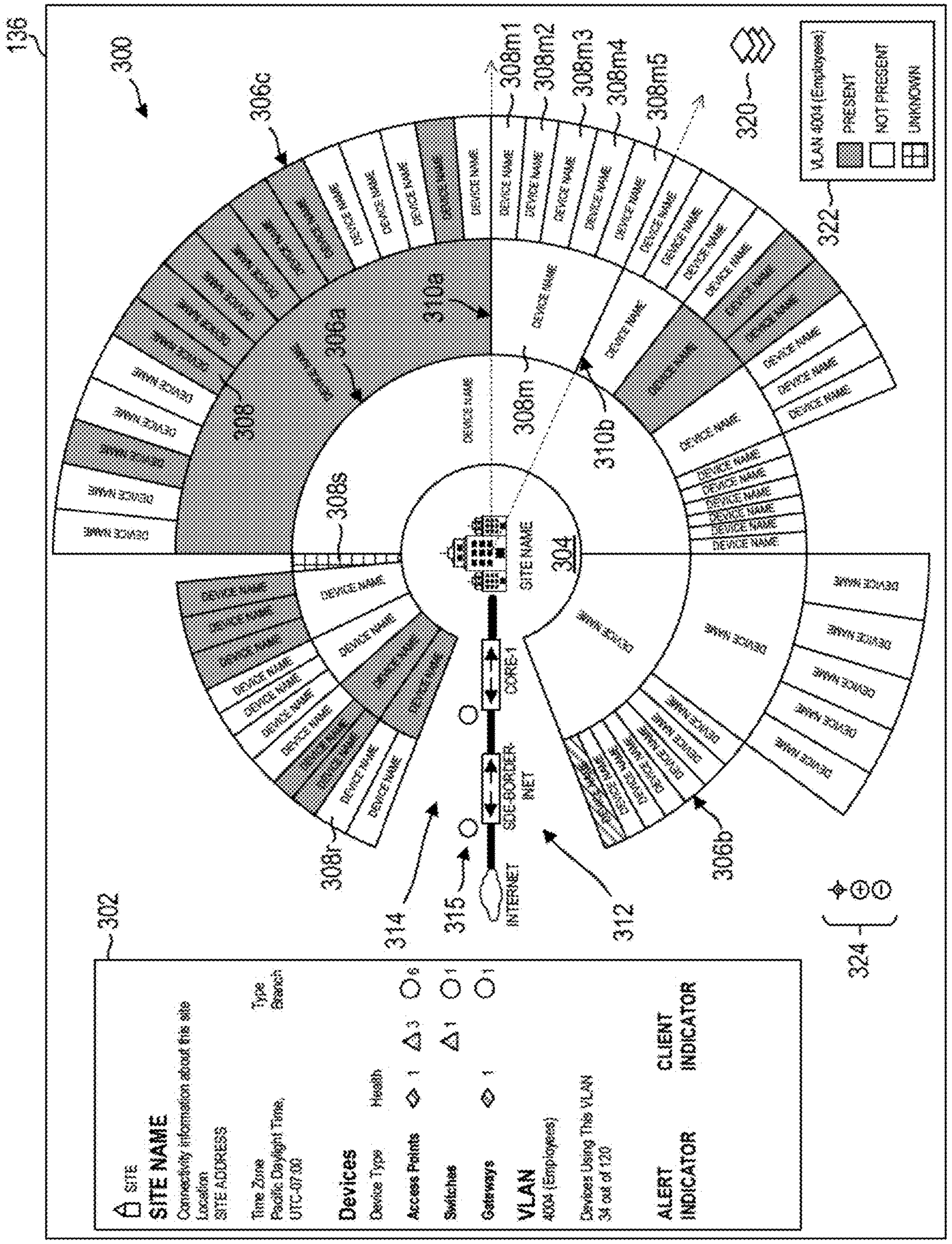

FIGS. 3A-3C illustrate an example network management GUI 136 that includes a sunburst diagram 300 at various stages of interaction, according to certain implementations. Sunburst diagram 300 may be an example of network visualization 138 generated by GUI generation engine 130 of FIG. 1. In the illustrated example sunburst diagram 300 also could be referred to as a multi-level pie chart, a radial treemap, an interactive radial sunburst diagram, or other suitable terms. Although shown to be a part of network management GUI 136, this disclosure contemplates GUI generation engine 130 generating sunburst diagram 300 independent of a network management GUI. For purposes of this example, it will be assumed that sunburst diagram 300 represents a particular site of managed communication network 102. Throughout the description of hierarchy 200, reference may be made to aspects of FIGS. 1 and 2. Again, however, it should be understood that reference to particular elements (e.g., sites 112, devices 110, etc.) in FIGS. 1, 2, and 3A-3C do not necessarily have any correlation to one another in terms of hierarchical arrangement.

In the illustrated example, network management GUI 136 includes sunburst diagram 300, a network information area 302, and one or more tools (e.g., a search box, a legend, navigational elements, etc.). Each of these aspects of FIGS. 3A-3C are described in greater detail below.

Network information area 302 may be a window, panel, or other region that displays different portions of network information 128 (of FIG. 1) depending on a state of navigation of sunburst diagram 300. For example, network information area 302 may display general information about managed communication network 102 (of FIG. 1), information regarding a particular site 112 of managed communication network 102, information related to a particular hierarchical level 202 of the hierarchy 200 of managed communication network 102, information related to a particular network device 110 of managed communication network 102, and/or any other suitable information. In certain implementations, network information area 302 includes information about managed communication network 102 that may redundant of information shown in sunburst diagram 300 and/or may supplement information reflected in sunburst diagram 300. It should be understood that any numbers shown in network information area of FIGS. 3A-3C are included for example purposes only and do not necessarily correlate to the information shown in sunburst diagram 300. Potential contents of network information area 302 are described in greater detail below in context with the description of sunburst diagram 300, as well as in connection with FIGS. 5A and 5B.

Continuing with FIGS. 3A-3C, FIG. 3A illustrates network management GUI 136 with sunburst diagram 300 in a first state of interaction. Sunburst diagram 300 includes a center region 304, which also may be referred to as an inner region, inner circle, core, or other suitable term. Sunburst diagram 300 also includes one or more rings 306 (e.g., illustrated as rings 306*a* through 306*c*, and referred to generally as rings 306). Rings 306 are arranged in a concentric manner and extend radially from center region 304. Each ring 306 at least partially surrounds center region 304. In certain implementations, rings 306 of sunburst diagram 300 may be annuli that at least partially surround center region 304, and possibly one or more inner rings 306, in one or more continuous or discontinuous ring segments 308.

As described above, managed communication network 102 includes multiple network devices 110 in a hierarchical arrangement (e.g., like hierarchy 200) that includes multiple hierarchical levels 202. Each of center region 304 and rings 306 may correspond to a respective hierarchical level 202, with hierarchical levels 202 extending deeper into the hierarchical arrangement (e.g., closer to the leaf nodes) in a direction from center region 304 to the outermost ring 306. For example, center region 304 may correspond to a first hierarchical level 202 (e.g., including, potentially, to a particular node/network device 110 of the first hierarchical level 202 of hierarchy 200), ring 306*a* may correspond to a second hierarchical level 202 (e.g., one hierarchical level 202 lower in the hierarchical arrangement of hierarchy 200), ring 306*b* may correspond to a third hierarchical level 202 (e.g., one hierarchical level 202 lower in the hierarchical arrangement of hierarchy 200), and ring 306*c* may correspond to a fourth hierarchical level 202 (e.g., one hierarchical level 202 lower in the hierarchical arrangement of hierarchy 200). Depending on a state of sunburst diagram 300, the first hierarchical level 202 to which center region 304 corresponds might or might not correspond to a root of the hierarchical arrangement of hierarchy 200. At the state illustrated in FIG. 3A, the first hierarchical level 202 is a site (e.g., of hierarchical level 202*b*) within the hierarchical arrangement of hierarchy 200.

Each ring 306 includes one or more ring segments 308, examples of which are labeled in FIG. 3A. Each ring segment 308 represents a corresponding network node of managed communication network 102 of FIG. 1. As described with reference to FIG. 2, a network node may include a network device 110 or other suitable node (e.g., an entity, a site, etc.) of managed communication network 102. For ease of description, ring segments 308 will be described as corresponding to network devices 110, but this disclosure is not intended to be so limited. For example, in a particular navigational state, center region 304 could correspond to an entity (e.g., a company) and a first ring 306*a* could correspond to one or more sites 112 of that entity, which each ring segment of the first ring 306*a* corresponding to a different site 112, which may or may not correspond to a particular network device 110.

The ring segments 308 of a particular ring 306 represent network devices 110 that are part of the hierarchical level 202 that corresponds to the particular ring 306. For example, ring segments 308 of ring 306*b* are part of the hierarchical level 202 that corresponds to ring 306*b* at a current state of sunburst diagram 300.

Additionally, the ring segments 308 of a particular ring 306 are arranged according to the hierarchical arrangement of managed communication network 102. For example, the ring segments 308 of adjacent rings 306 are arranged according to the parent-child relationship of the network devices 110 that correspond to those ring segments 308. In certain implementations, the ring segments 308 in a particular ring 306 that correspond to child network devices 110 that are children of a parent network device 110 that corresponds to a ring segment 308 of an adjacent interior ring 306 fall within an angular range associated with the ring segment 308 of the adjacent interior ring 306. The angular range may be defined by imaginary vectors extending from a center point of sunburst diagram 300 and coincident with linear edges and of the ring segment 308 of the adjacent inner ring 306.

As a particular example, assume a parent network device 110 corresponds to a ring segment 308*m* in ring 306*b*, and the parent network device 110 has five child network devices 110 with corresponding ring segments (labeled as ring segments 308*m*1-308*m*5) in ring 306*c*. In certain implementations, ring segments 308*m*1-308*m*5 in ring 306*c* may fall within an angular range defined by imaginary vectors (shown as dashed lines) extending from a center point of sunburst diagram 300 and coincident with linear edges 310*a* and 310*b* of ring segment 308*m* in adjacent inner ring 306*b*. In the case of the network device 110 that corresponds to center region 304 (if applicable), the ring segments 308 of the inner-most ring 306 (e.g., ring 306*a* in FIG. 3A) may correspond to network devices 110 that are children of the network device 110/hierarchical level that corresponds to center region 304.

The relative sizes (e.g., areas) of ring segments 308 may be determined in any suitable manner. As just one example, ring segments 308 that correspond to network devices 110 that have more descendants than ring segments 308 that correspond to other network devices 110 that have fewer descendants may be relatively larger. In certain scenarios, some network devices 110 may have no descendants in the hierarchical arrangement of managed communication network 102 (e.g., may be leaf nodes), while other network devices 110 at the same hierarchical level do have descendants. In such a scenario, at least a next adjacent outer ring 306 may be discontinuous. For example, the network device 110 corresponding to ring segment 308*r* of ring 306*b* has no children, and thus ring 306*c* is discontinuous with no ring segments 308 adjacent to ring segment 308*r* of ring 306*b*. As another example, the network device 110 corresponding to ring segment 308*s* of ring 306*a* has no children, and thus ring 306*b* is discontinuous with no ring segments 308 adjacent to ring segment 308*s* of ring 306*a*.

In certain implementations, each ring segment 308 may include a device identifier (e.g., shown as Device Name) of the network device 110 that corresponds to that ring segment 308. In some navigational states of sunburst diagram 300, whether or not a device identifier is displayed in a particular ring segment 308 may depend partly on an area of the ring segment 308. For example, certain ring segments 308 may be considered to occupy too small an area to legibly include a device identifier, and the device identifier may be omitted. This disclosure contemplates sunburst diagram 300 including or not including device identifiers in ring segments 308 according to any suitable criteria.

In the illustrated example, sunburst diagram 300 includes network connectivity path indicator 312. In certain implementations, sunburst diagram 300 includes an opening 314 extending from center region 304 through rings 306 (and potentially all rings 306) surrounding center region 304, and network connectivity path indicator 312 is displayed in and through opening 314. In certain implementations, network connectivity path indicator 312 includes a path from the network device 110 that corresponds to center region 304 to the Internet. As will be described in greater detail below, the network device 110 that corresponds to center region 304 may change (e.g., in response to navigational inputs related to sunburst diagram 300). In response to a change of the network device 110 that corresponds to center region 304, GUI generation engine 130 may update network connectivity path indicator 312 to reflect the network connectivity path appropriate for the network device 110 that now corresponds to center region 304. In certain implementations, network connectivity path indicator 312 includes one or more status indicators 315 to show the relative statuses of devices included in network connectivity path indicator 312. The status indicators 315 may be shaded or otherwise marked according to the same status that would be used to show device health.

Figure 6A:
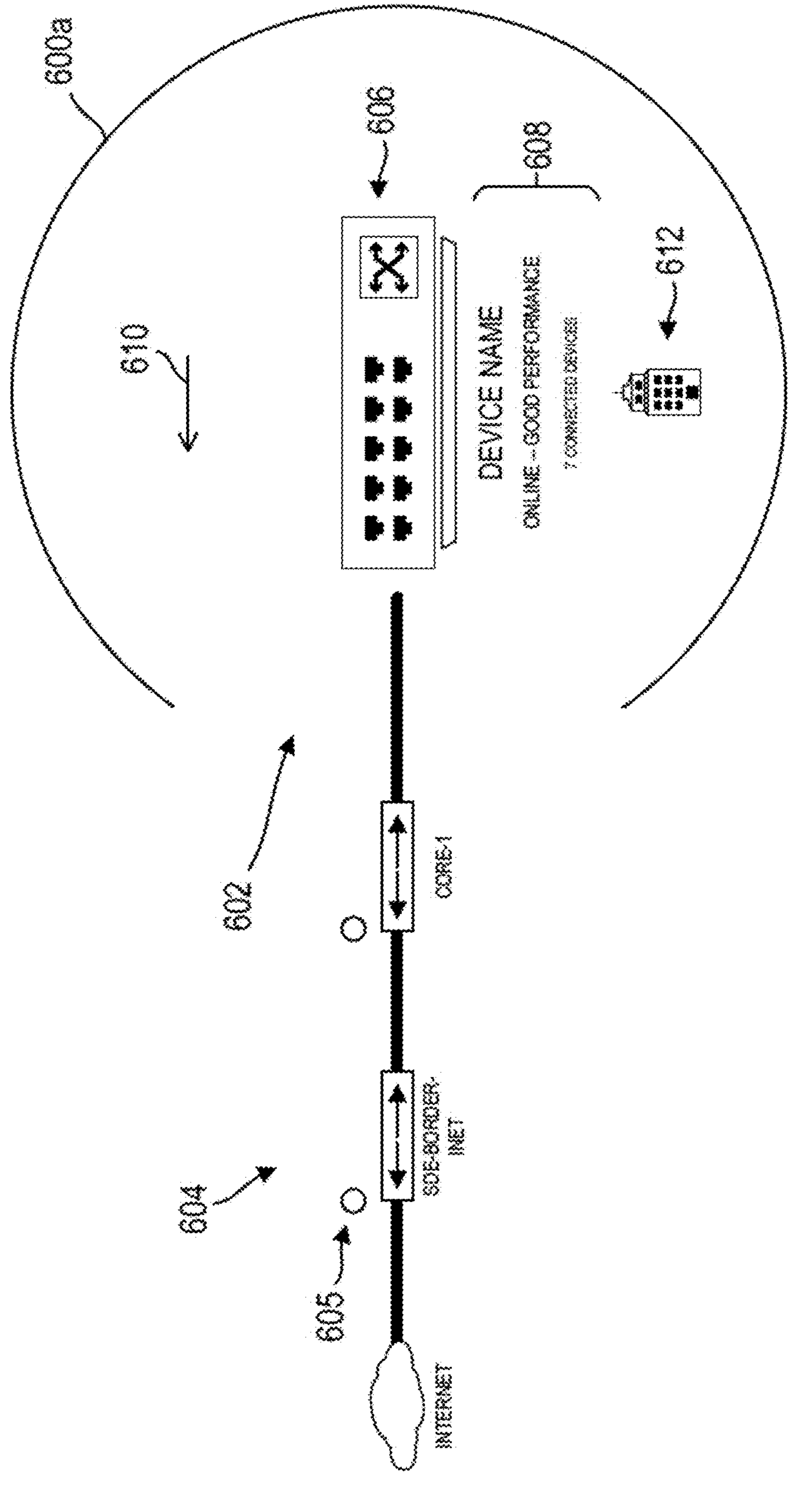
FIGS. 6A-6B illustrate an example center region of a sunburst diagram in greater detail, according to certain implementations.
Figure 6B:
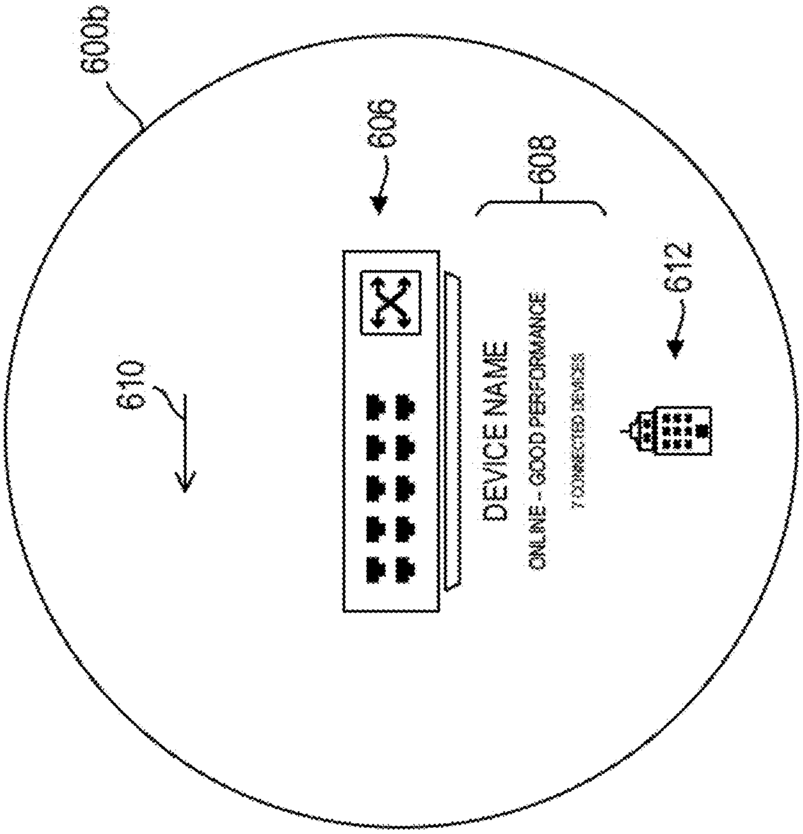

Although network connectivity path indicator 312 and opening 314 are shown on the left side of sunburst diagram 300, this disclosure contemplates network connectivity path indicator 312 and opening 314 being located at any suitable portion of sunburst diagram 300. Although shown to include network connectivity path indicator 312 and opening 314, this disclosure contemplate sunburst diagram 300 being generated without one or more of network connectivity path indicator 312 and/or opening 314. For example, this disclosure contemplates center region 304 being a full circle (e.g., without opening 314) and rings 306 extending fully around opening 314, continuously or discontinuously as may be appropriate for a given implementation due, for example, to dependencies of network device 110. Closer views of example center regions with and without network connectivity path indicator 312 and opening 314 are shown in FIGS. 6A and 6B, described below.

Continuing with FIGS. 3A-3C, in some hierarchical arrangements, one or more network devices 110 may have multiple parent network devices 110. GUI generation engine 130 may determine where in sunburst diagram 300 to position a ring segment 308 for a particular network device 110 that has multiple parents in any suitable manner. For example, GUI generation engine 130 may position a ring segment 308 for the particular network device 110 based on relative priorities of the relationships between the particular network device 110 and the different parent network devices 110, randomly, and/or in any other suitable manner.

The following provides some specific examples of how GUI generation engine 130 may determine where in sunburst diagram 300 to position a network device 110 that has multiple parent network devices 110. It should be understood that these are provided as examples only. The relative priorities in one example may be as follows: (1) Switch (e.g., virtual switching extension (VSX)) multi-chassis (MC)—link aggregation group (LAG) (MC-LAG)—select the switch with the primary role for the LAG interface; (2) Layer 3 (L3) link (with equal-cost multi-path (ECMP) routing)—both links may be of equal preference, so use desired tie-breaker; (3) Layer 2 (L2) link with STP—pick link that is in a Forwarding state in STP table; (4) L3 link (no ECMP)—pick link and next-hop that shows up in "show IP route;" (5) MC-LAG (non-VSX)—pick virtual router redundancy protocol (VRRP) primary; and (6) L2 link with no STP—both links may be of equal preference, so use desired tie-breaker.

In certain implementations, sunburst diagram 300 is configured to display information according to one or more network information layers of network information 128. In certain implementations, a user may control what information is shown in sunburst diagram 300 and network information area 302. To that end, network management GUI 136 may include a layer selection icon 320, which may be selected to modify which information layer sunburst diagram 300 includes. In the illustrated example, in response to selection of layer selection icon 320, GUI generation engine 130 may cause a layer selection window to be displayed, which may be implemented as a pop-up window or another suitable manner. Additional details related to selecting an information layer are described below with reference to FIGS. 4A-4D.

As described above, network information 128 may include information that is organized into, or that can be organized into, one or more information layers for presentation as part of sunburst diagram 300. For example, network information 128 may include varying layers of information that may be selected for display as part of sunburst diagram 300. As particular examples, network information 128 may include information at a device layer (e.g., network devices 110), a network layer, a link layer, and/or at any other suitable layer elements of managed communication network 102.

The information related to the selected layer may be indicated on sunburst diagram 300 in any suitable manner. For example, the information may be indicated using particular shading, such as particular colors and/or particular pattern fills. As a particular example, the information of a selected layer may be indicated for a particular network device 110 by shading the ring segment 308 for the particular network device 110 using a suitable pattern fill and/or fill color. In the following description of example layers, example indicators also are described. Of course, other potential indicators are possible.

At a device level, network information 128 may include information related to the health of network devices 110, the types of network devices 110, the fabric role of network devices 110, and/or other suitable attributes of network devices 110. In certain implementations, the health of network devices 110 may be characterized as Good (e.g., a white (in the illustrated example) or green fill), Fair (e.g., a dotted (in the illustrated example) or yellow fill), or Poor (a striped (in the illustrated example) or red fill). In certain implementations, the device type of a network device 110 may be one or more of AP (e.g., a blue fill), Switch (e.g., a teal fill), Gateway (e.g., a purple fill), Unknown (e.g., a gray fill), and/or any other suitable device type. In certain implementations, the device fabric role of a network device 110 may be characterized as Edge (e.g., a navy fill), Aggregate (e.g., a teal fill), Core (e.g., a purple fill), Stub (e.g., a black fill), Border (a light blue fill), and/or any other suitable role.

At a network level, the network information may include information related to the network details for each network device 110. Example network information may include VLAN information, STP domain information, OSPF information, and BGP information. For each of these types of network information, the information may indicate whether the network type is present (e.g., a dark blue fill), not present (e.g., a gray fill), or unknown (e.g., a white fill).

At a link level, the network information may include information indicating whether issues exist with a link between network devices 110. Link issues may fall into one or more categories, such as major issues (with an associated status of poor and shown using, e.g., a red fill) or minor issues (with an associated status of fair and shown using, e.g., a yellow fill).

Continuing with FIG. 3A, network management GUI 136 may include a legend 322 defining how the selected network information is incorporated into sunburst diagram 300. For example, sunburst diagram may include indicators, such as shading or other suitable indicators, related to the selected network information layer, and legend 322 may indicate the correspondence between those indicators and the network information displayed. As just one particular example, if a device health network information layer is selected (e.g., a device layer and a health sub-layer), GUI generation engine 130 may fill ring segments 308 with shading to indicate a device health of the network devices 110 that correspond to the ring segments 308 (e.g., white fill for Good (alternatively, green), dotted pattern fill for Fair (alternatively yellow), and striped fill for Poor (alternatively red)).

In the illustrated example of FIG. 3A, ring segment 308*x* in ring 306*c* is shown to include shading that corresponds to a device health status of Fair, meaning that a network device 110 that corresponds to ring segment 308*x* has a device health status of Fair (e.g., according to network information 128 of FIG. 1). Additionally, in the illustrated example of FIG. 3A, ring segments 308 marked by bracket 309 include a ring segment in 306*b* and ring segments 308 in ring 306*c*, which correspond to a parent network device 110 and three child network devices 110 of the parent network device 110. The four ring segments marked by bracket 309 are shown to include shading that corresponds to a device health status of Poor, meaning that the network devices 110 that correspond to the ring segments 308 marked by bracket 309 have a device health status of Poor (e.g., according to network information 128 of FIG. 1).

Sunburst diagram 300 may provide a particularly efficient and user friendly way of presenting information associated with a selected network information layer to a user. This may be due in part to the ability to see most, if not all, of the network devices 110 and associated hierarchical levels on a display concurrently. For example, a user may be able to quickly locate areas of interest in sunburst diagram 300 (e.g., according to the shading or other indicator), and click on appropriate ring segments 308 for additional information related to the network devices 110 that correspond to those ring segments 308. Not only may this save the user's time in identifying areas of interest, but the ease of identifying areas of interest may save valuable processing resources that a user may incur navigating to different areas of other representations of network hierarchies (e.g., a tree diagram) that do not present information in such an efficient manner. Furthermore, as the user may be able to identify relevant information more efficiently using network management GUI 136 and/or sunburst diagram 300, the user may be able to service managed communication network 102 in a more efficient manner, which may improve operation of managed communication network 102.

FIG. 3A illustrates sunburst diagram 300 at a state in which center region 304 corresponds to a first hierarchical level 202 of the hierarchical arrangement of managed communication network 102. The first hierarchical level 202 could be the root of the hierarchical arrangement or another hierarchical level 202. In an example, the first hierarchical level 202 corresponds to a site, which might or might not be an initial state of sunburst diagram 300. Extending outwardly, each subsequent ring 306 may correspond to the next lower hierarchical level 202 of the hierarchical arrangement of managed communication network 102, proceeding in a direction from parent nodes to child nodes. In other words, each ring 306 of sunburst diagram 300 may correspond to a respective one of the hierarchical levels 202 of the hierarchical arrangement of managed communication network 102.

Sunburst diagram 300 may be interactive, such that a user (e.g., a network administrator) can navigate by interacting directly with sunburst diagram 300. For example, a user may be able to interact with sunburst diagram 300 using a mouse and/or keyboard. In certain implementations, a user may navigate between the different network devices 110 and/or hierarchical levels of network devices 110 of sunburst diagram 300 by clicking on ring segments 308 of rings 306 or other areas of sunburst diagram 300.

As described in greater detail below with reference to FIG. 3B, selection of a particular ring segment 308 (e.g., selection of a particular network device 110 that corresponds to that ring segment 308) may cause a transition effect in which GUI generation engine 130 regenerates sunburst diagram 300 with center region 304 of sunburst diagram 300 being updated to correspond to the particular network device 110 and the one or more remaining rings 306 (if any)

corresponding to network devices that are descendants of the particular network device 110 (if any), allowing the user to quickly obtain a more detailed information related to the particular network device 110 and its descendants. In certain implementations, GUI generation engine 130 may update network information area 302 to include additional details related to the particular network device 110. The following describes interactions with sunburst diagram 300, using mouse hover, single-click, and double-click interactions as examples. These are provided for example purposes only.

A mouse hover interaction may describe a scenario in which, using a mouse, a user positions the mouse pointer over a particular portion of sunburst diagram 300, and the associated response of GUI generation engine 130 is to alter network management GUI 136, potentially including sunburst diagram 300.

For a mouse hover interaction, a tooltip may be displayed while the mouse pointer is hovering over a ring segment 308 (e.g., a network device 110) or a link of network connectivity path indicator 312. A tooltip may be a pop-up that includes additional information about the network device 110 or link over which the mouse pointer is hovering on sunburst diagram 300 or network connectivity path indicator 312.

In the case of a network device 110, for example, the additional information may include a device name (e.g., as a title for the pop-up), a health summary (e.g., a shading-coded icon indicating a health status and/or an associated text label (e.g., "Online—Good performance"), device type (e.g., switch), a device model (e.g., CX 6300M), a fabric role (e.g., Edge), a number of clients (e.g., descendants represented as an integer value), and/or any other suitable information. In the case of a link, for example, the additional information may include a title of "Link," a health summary (e.g., a shading-coded and/or shape-coded icon indicating a health status and/or an associated text label (e.g., "Up"), link endpoint information (e.g., "From Device Type" with a device name and port identifier, and "To Device" with a device name and port identifier, the device types being, for example, AP, Switch, Gateway, Device (e.g., device type unknown)), a link type (e.g., Access, Trunk, Routed), and/or any other suitable information.

Depending on the selected information layer, the displayed toolkit may include additional information related to the selected information layer. For example, if the VLAN information layer is selected, the additional information displayed in the toolkit may include VLAN status (e.g., Present, Not Present, Unknown), STP Domain (e.g., IP Address, with the value being IPv4 of IPv6 of the network device 110 associated with the ring segment 308 over which the mouse pointer is hovering), overlay network information (e.g., number of tunnels in network), overlay segment information (e.g., number of tunnels in the segment), and/or any other suitable additional information related to the selected information layer. If an STP information layer is selected, the additional information displayed in the toolkit may include STP Domain (e.g., From/To IP Address on the domain), overlay network information (e.g., network present or not), overlay segment information (e.g., number of tunnels in the segment), and/or any other suitable additional information related to the selected information layer. If a wireless local area network (WLAN) information layer is selected, certain WLAN information may be displayed in the toolkit.

In certain implementations, when a mouse pointer is hovering over a particular ring segment 308 (e.g., a particular network device 110), GUI generation engine 130 may dim one or more other portions of sunburst diagram 300. As a particular example, when a mouse pointer is hovering over a particular ring segment 308 (e.g., a particular network device 110), GUI generation engine 130 may display ring segments 308 corresponding to other network devices 110 that are directly connected to the particular network device 110 in a normal, default state (e.g., not dimmed) and other portions of sunburst diagram 300, such as ring segments 308 corresponding to other network devices 110 that are not directly connected to the particular network device 110 in a dimmed manner. In certain implementations, directly connected network devices include parent network devices 110, sibling network devices 110, and child network devices 110.

As described above, a network device 110 may have more than one parent. Thus, the ring segment 308 for the particular network device 110 might not be in contact with the ring segment(s) 308 for all parent network devices 110 and/or child network devices 110 for the particular network device 110. In certain implementations, all parent network devices 110 for and/or child network devices 110 of the particular network device 110 remain undimmed when the mouse pointer hovers over the ring segment 308 for the particular network device 110. In certain implementations, ring segments 308 for sibling network devices 110 of the particular network device 110 also might or might not be in direct contact with the ring segment 308 for the particular network device 110, and remain undimmed when the mouse pointer hovers over the ring segment 308 for the particular network device 110.

Turning to a single-click mouse interaction, in certain implementations, a single-click mouse interaction selects the particular network device 110 associated with a particular ring segment 308 without causing GUI generation engine 130 to navigate to the particular network device 110. For example, a single-click mouse interaction may select the particular network device 110 associated with a particular ring segment 308 without causing GUI generation engine 130 to regenerate sunburst diagram 300 with information related to the particular network device 110 displayed in center region 304 and the one or more rings 306 updated accordingly. In certain implementations, a single-click mouse interaction causes the selected ring segment 308 for the particular network device 110 to be highlighted in some manner while causing other portions of sunburst diagram 300 associated with other network devices 110 to be dimmed, to thereby indicate selection of the particular network device 110. In certain implementations, when a particular network device 110 is selected (e.g., the ring segment 308 corresponding to the particular network device 110 is selected), network information area 302 of network management GUI 136 may be displayed and/or updated to display information related to the selected particular network device 110.

For a double-click mouse interaction, in certain implementations, a double-click mouse interaction with a particular ring segment 308 (e.g., a particular network device 110) may cause sunburst diagram 300 to navigate to the particular network device 110. For example, a double-click mouse interaction with a particular ring segment 308 (e.g., a particular network device 110) may cause GUI generation engine 130 to regenerate, in response to the selection of the particular ring segment 308, sunburst diagram 300 such that center region 304 includes information for the particular network device 110 that corresponds to the selected particular ring segment 308 and, if that selected network device 110 has any child network devices 110 in the hierarchy of managed communication network 102, an inner-most ring 306 includes one or more ring segments 308 that each correspond to a network device 110 that is a child of the particular network device 110.

If applicable, sunburst diagram 300 may be repositioned to an appropriate location within network management GUI 136 upon regeneration of sunburst diagram 300. This repositioning may include centering sunburst diagram 300 to an appropriate area of display 124 (of FIG. 1) and/or network management GUI 136, adjusting a zoom factor associated with a view of sunburst diagram 300 to a default zoom factor, and/or performing any other suitable repositioning operations. In certain implementations, the height of center region 304 and, if remaining after regeneration of sunburst diagram 300, one or more rings 306 may remain the same following regeneration of sunburst diagram 300, though this disclosure contemplates other implementations.

If present in the particular implementation of sunburst diagram 300, network connectivity path indicator 312 may be updated as part of regenerating sunburst diagram 300. For example, because center region 304 of sunburst diagram 300 now corresponds to the selected particular network device 110, GUI generation engine 130 may update network connectivity path indicator 312 to illustrate the network connectivity path from the selected particular network device 110 to the Internet or another suitable location/device.

It should be understood that although mouse hovers, single-clicks, and double-clicks are described above, this disclosure contemplates any suitable types of interactions with sunburst diagram 300 or other portions of a network management GUI 136. For example, this disclosure contemplates keyboard interaction, voice interaction, and/or other suitable types of interaction to navigate sunburst diagram 300 or other portions of a network management GUI 136. Furthermore, although particular types of interactions are described as corresponding to particular types of inputs (e.g., mouse hovers, single-clicks, and double-clicks), this disclosure contemplates those interactions corresponding to different types of inputs.

Network management GUI 136 may include one or more additional navigational elements. In the illustrated example, these navigational elements include view adjustment controls 324 and a search field 326. Although particular additional navigational elements are shown and described, network management GUI 136 may include any suitable number and types of navigational elements for interacting with network management GUI 136.

View adjustment controls 324 may include a re-center control, a zoom-in (e.g., magnify) control, and a zoom-out (de-magnify) control. View adjustment controls 324 may allow a user to zoom in and zoom out of portions of sunburst diagram 300 (and/or possible other portions of network management GUI 136), and to re-center if appropriate. To the extent zooming in results in sunburst diagram 300 being too large to display in a display area of network management GUI 136, additional scroll bars may appear to move sunburst diagram 300. Additionally or alternatively, a user may be able to click and drag sunburst diagram 300, possibly using a combination of pressing a key and clicking and dragging with a mouse, for example.

Certain implementations of network management GUI 136 may include a search field 326. When no content is entered in search field 326, search field 326 may include a search indicator (shown as "Search" and in a dimmed manner, for example), indicating that the purpose of search field 326 is for searching. In certain implementations, search field 326 may be used to sunburst diagram 300 for particular network devices 110 matching the search parameters entered into search field 326. In certain implementations, GUI generation engine 130 of FIG. 1 receives the search criteria input into search field 326 and searches network information 128 and/or sunburst diagram 300 to locate a network device 110 that satisfies the search criteria. In certain implementations, acceptable search criteria may include device name, MAC address, IP address, serial number, and/or any other suitable search criteria.

In certain implementations, in response to identifying a network device 110 that satisfies the search criteria, GUI generation engine 130 may automatically regenerate sunburst diagram 300 such that the identified network device 110 is moved to center region 304 (if the identified network device 110 does not already correspond to center region 304), and may update network information area 302 with details of the identified network device 110. In some implementations, in response to identifying a network device 110 that satisfies the search criteria, GUI generation engine 130 may highlight or otherwise visually identify the ring segment 308 that corresponds to the identified network device 110 while leaving the identified network device 110 at its existing location in sunburst diagram 300, and may update network information area 302 with details of the identified network device 110.

FIG. 3B illustrates sunburst diagram 300 at a state in which center region 304 corresponds to a particular network device 110 according to a selection of a ring segment 308 (e.g., a particular network device 110) from the state of sunburst diagram 300 of FIG. 3A. In particular, the state of sunburst diagram 300 in FIG. 3B may result from a selection of ring segment 308*w* of sunburst diagram 300 in FIG. 3A. Although this disclosure contemplates selection of a particular ring segment 308 being made in any suitable manner, in certain implementations, selection of a particular ring segment 308 (e.g., ring segment 308*w*) may be made by double-clicking on the particular ring segment 308*w* in the manner described above.

As illustrated in FIG. 3B, center region 304 has been updated to correspond to the network device 110 that corresponded to ring segment 308*w* of FIG. 3A. GUI generation engine 130 may receive navigational input that is a selection of a particular ring segment 308 of a network visualization 138 (e.g., a particular ring segment 308*w* of sunburst diagram 300 in FIG. 3A) and GUI generation engine 130 may regenerate network visualization 138 (e.g., sunburst diagram 300) according to the selected particular ring segment 308, resulting in the state of sunburst diagram 300 shown in FIG. 3B.

Regenerating sunburst diagram 300 may include moving the network device 110 that corresponds to selected ring segment 308*w* to center region 304 of sunburst diagram 300. In certain scenarios, regenerating sunburst diagram 300 may include updating one or more rings 306 of sunburst diagram 300 according to the selection of a particular ring segment 308 of sunburst diagram 300 (e.g., the selection of ring segment 308*w* of sunburst diagram 300). For example, with the update to center region 304, the rings 306 of sunburst diagram 300 may be updated to include ring segments 308 that correspond to network devices 110 that are descendants of the network device 110 that now corresponds to center region 304 and omit ring segments 308 that do not correspond to network devices 110 that are descendants of the network device 110 that now corresponds to center region 304.

The number of remaining rings 306 may correspond to the number of hierarchical levels under the hierarchical level of the selected network device 110 (the network device 110 that corresponded to ring segment 308*w* and now corresponds to center region 304) that include a descendant of the selected network device 110. For example, if the selected network device 110 includes only children with no grandchildren or beyond, then in certain implementations, the regenerated sunburst diagram 300 may include one ring 306 around center region 304. As another example, if the selected network device 110 includes only children and grandchildren, then in certain implementations, the regenerated sunburst diagram 300 may include two rings 306 around center region 304. Of course, additional rings 306 are possible if additional hierarchical levels 202 include descendants of the selected network device 110. If the selected network device 110 has no descendants (e.g., is a leaf node of the hierarchical arrangement of the managed communication network 102), then the regenerated sunburst diagram 300 might include a center region 304 without surrounding rings 306. In certain implementations, within each remaining ring 306, if any, the remaining ring segments 308 (e.g., that correspond to network devices 110 that are descendants of the network device 110 of the selected ring segment 308*w*) may be redistributed around the updated center region 304, as appropriate, according to parent-child relationships.

Returning to the particular example of FIGS. 3A-3B, in FIG. 3A, ring segment 308*w* (and its corresponding network device 110) in ring 306*a* includes eight children in ring 306*b* (shown as eight ring segments 308 in ring 306*b*). One child ring segment 308*w* of ring segment 308*w* includes five child ring segments in ring 306*c*, while the remaining seven children of ring segment 308*w* have no child ring segments 308, meaning that ring segment 308*w* is shown to include five grandchild ring segments 308 in ring 306*c*, all from a single child ring segment 308 of ring segment 308*w*. Turning to FIG. 3B, with the selection of ring segment 308*w* and movement of ring segment 308*w* (and its corresponding network device 110) to center region 304, ring 306*a* is updated to include the eight child ring segments 308 of ring segment 308*w* and ring 306*b* is updated to include the five grandchild ring segments 308 of one of the child ring segments 308 of ring segment 308*w*. Because in this example ring segment 308*w* does not have any descendants beyond grandchildren, updated sunburst diagram 300 includes only two rings 306*a* and 306*b* around updated center region 304.

In certain implementations, a regenerated sunburst diagram 300 may continue to display network information related to a selected network information layer, if any. For example, if a network information layer has previously been selected for display of suitable information in sunburst diagram 300, then the regenerated sunburst diagram 300 may continue to display suitable network information for the remaining ring segments 308 (and corresponding network devices 110) shown. In the illustrated example of FIG. 3B, ring segment 308*x* continues to include shading to indicate a device status of Fair, as was the case in the state of sunburst diagram 300 of FIG. 3A.

Continuing with FIG. 3B, regenerating sunburst diagram 300 may include updating network connectivity path indicator 312 according to the selection of the ring segment 308*w* of sunburst diagram 300. For example, as described above, certain implementations of sunburst diagram 300 may include an opening 314 extending from center region 304 through all of the rings 306 surrounding center region 304, and a network connectivity path indicator 312 may be displayed in opening 314. In accordance with moving the network device 110 that corresponds to the selected ring segment 308*w* of sunburst diagram 300 to center region 304, the network connectivity path indicator 312 may be updated to show the network connectivity path from the network device 110 that now corresponds to center region 304 to another network location (e.g., the Internet). For example, in response to the network device 110 that corresponds to center region 304 changing, GUI generation engine 130 may update network connectivity path indicator 312, as appropriate.

In certain implementations, one or more other aspects of network management GUI 136 may be updated in accordance with regenerated sunburst diagram 300. For example, network information area 302 may be updated to include network information associated with the network device 110 that now corresponds to center region 304. Additional details regarding example content of network information area 302 are described below with reference to FIGS. 5A-5B.

FIG. 3C illustrates an example sunburst diagram 300 at a state in which a network information layer has been changed relative to the network information layer that corresponds to the state of sunburst diagram 300 in FIG. 3A, according to certain implementations. In particular, the state of sunburst diagram 300 illustrated in FIG. 3C may result from a selection of a particular network information layer made at a state of sunburst diagram illustrated in FIG. 3A, and GUI generation engine 130 having regenerated sunburst diagram 300 according to that selected network information layer. Although this disclosure contemplates selection of a particular network information layer being made in any suitable manner, in certain implementations, selection of a particular network information layer may be made via layer selection icon 320 and one or more layer selection windows (e.g., as described below with reference to FIGS. 4A-4D).

As illustrated in FIG. 3C, the information reflected in sunburst diagram 300 has been updated according to a selection of a different network information layer. GUI generation engine 130 may receive the selection of a network information layer and regenerate network visualization 138 (e.g., sunburst diagram 300) according to the selected network information layer, resulting in the state of sunburst diagram 300 shown in FIG. 3C.

This disclosure contemplates any suitable technique for GUI generation engine 130 to regenerate sunburst diagram 300 to display information for a selected information layer. For example, in response to selection of a network information layer, GUI generation engine 130 may access network information 128 based on the selected network information layer and regenerate sunburst diagram 300 to include information for the selected network information layer. GUI generation engine 130 may access one or more rules to determine what types of indicators (e.g., shading) to include in sunburst diagram 300 to reflect the selected network information layer. In certain implementations, GUI generation engine 130 may apply one or more rules based on the accessed network information 128 to determine which indicator to apply for a network information layer (e.g., an indicator for Good, Fair, or Poor). In certain implementations, the appropriate category for a particular network device 110 for a particular network information layer may be determined by another aspect of a network management system 104, and GUI generation engine 130 may access the information maintained by the other aspect of the network management system 104 to determine what information to display for each device (e.g., in each ring segment 308) in sunburst diagram 300.

In certain implementations, one or more other aspects of network management GUI 136 may be updated in accordance with regenerated sunburst diagram 300. For example, network information area 302 may be updated to include network information associated with the selected network information layer for the network node (e.g., site, network device 110, etc.) that corresponds to center region 304. As another example, legend 322 may be updated to include information suitable for the selected network information layer. Additional details regarding example content of network information area 302 are described below with reference to FIGS. 5A-5B.

FIGS. 4A-4D illustrate an example layer selection window 400 at various states, according to certain implementations. In the illustrated example, layer selection window 400 includes a primary layer selection input field 402, which may be used to input a selection of an information layer for display as part of network management GUI 136, such as part of sunburst diagram 300 of FIG. 3. In this example, layer selection input field may be implemented as a select component and/or a multi-select component. Layer selection window 400 may be displayed at the state illustrated in FIG. 4A in response to user selection of layer selection icon 320 of FIGS. 3A-3C.

Figure 4A:
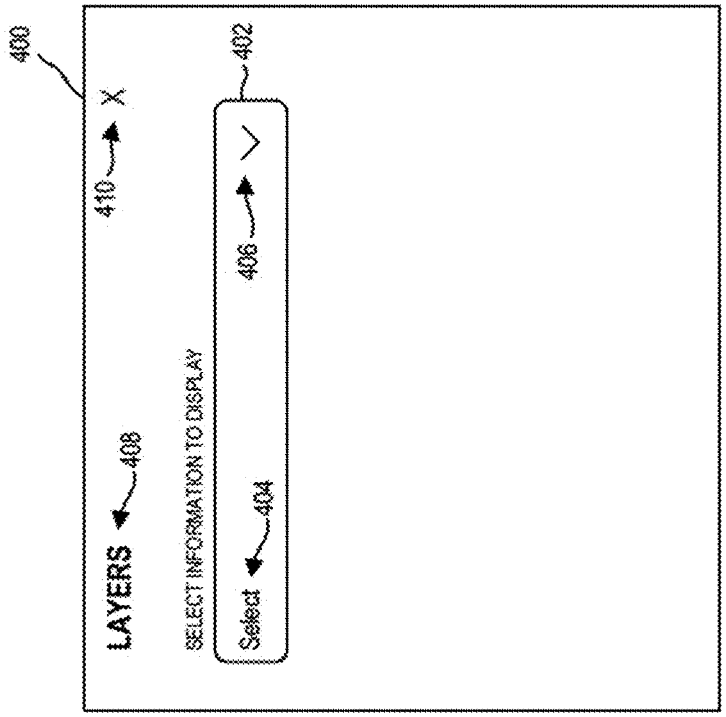
FIGS. 4A-4D illustrate an example layer selection window at various states, according to certain implementations.

As illustrated in FIG. 4A, primary layer selection input field 402 is in a closed state. Primary layer selection input field 402 includes an indicator 404 ("Select") that indicates that primary layer selection input field 402 is available for inputting a layer selection. Primary layer selection input field 402 may include a control 406, which may be used to transition primary layer selection input field 402 from a closed state to an open state and from an open state to a closed state. As primary layer selection input field 402 is in a closed state in FIG. 4A, control 406 indicates that primary layer selection input field 402 can be opened by selecting control 406, and selection of control 406 causes primary layer selection input field 402 to transition from a closed state to an open state. In this particular example, control 406 with primary layer selection input field 402 in the closed state is shown as a downward arrow, or chevron.

Additionally, layer selection window 400 may include a label 408. Label 408 may be "LAYERS," and may indicate, for example, that layer selection window 400 is for selecting an information layer for display as part of network management GUI 136, such as part of sunburst diagram 300 of FIG. 3. Layer selection window 400 may include a close window action icon 410, that may be used to close layer selection window 400. For purposes of the example illustrated in FIGS. 4A-4D, label 408 and close window action icon 410 are persistently shown.

Figure 4B:
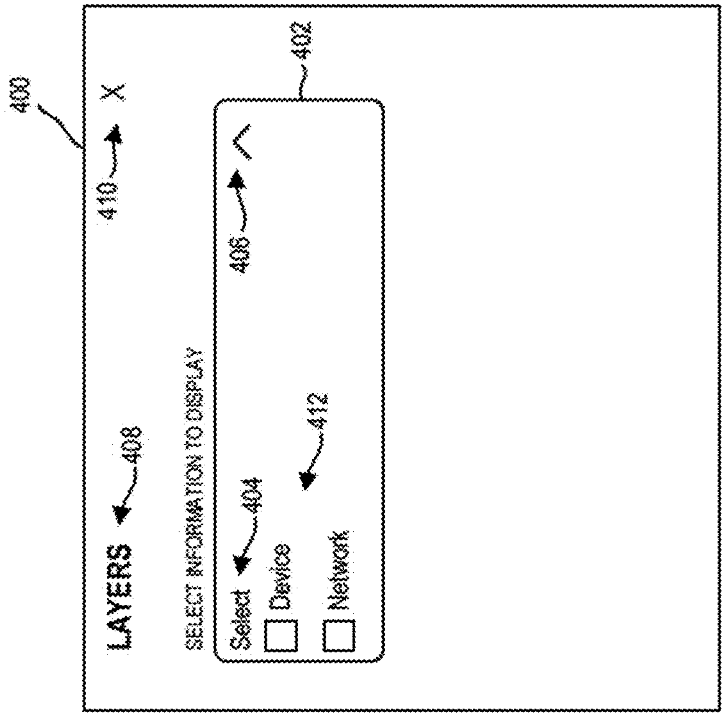

As illustrated in FIG. 4B, in response to selection of control 406, primary layer selection input field 402 has transitioned from a closed state to an open state, revealing options list 412. Options list 412 may list primary layer options for selection. These primary layer options may include top-level information layers that may be selected for display as part of network management GUI 136, such as part of sunburst diagram 300 of FIG. 3. In the illustrated example options list 412 includes two selectable options, "Device" and "Network." Each selectable option includes a selection box and associated text (e.g., the name of the information layer) positioned adjacent to the selection box.

With primary layer selection input field 402 in the open state, certain changes may be made to primary layer selection input field 402. For example, with primary layer selection input field 402 in the open state, control 406 has changed to indicate that primary layer selection input field 402 can be closed by selecting control 406, and selection of control 406 causes primary layer selection input field 402 to transition from an open state to a closed state. In this particular example, control 406 with primary layer selection input field 402 in the open state is shown as an upward arrow, or chevron.

In certain implementations, in response to detecting selection of a primary layer option from options list 412, GUI generation engine 130 may cause one or more secondary options to be displayed, if appropriate. The particular secondary layer options displayed may be particular to the selected primary layer option. Two potential example implementations are described below with reference to FIGS. 4C and 4D.

Figure 4D:
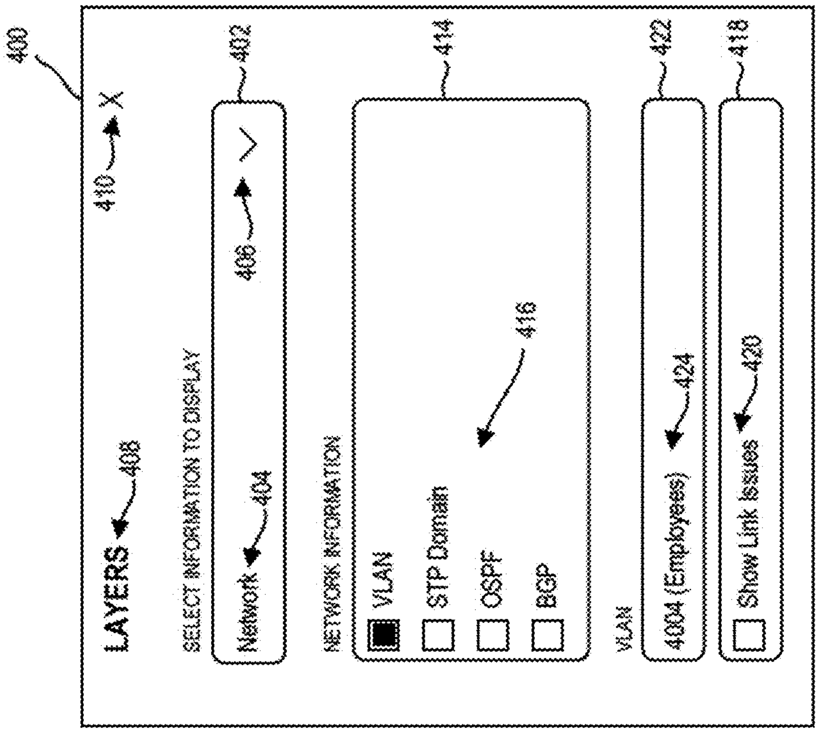
Figure 4C:
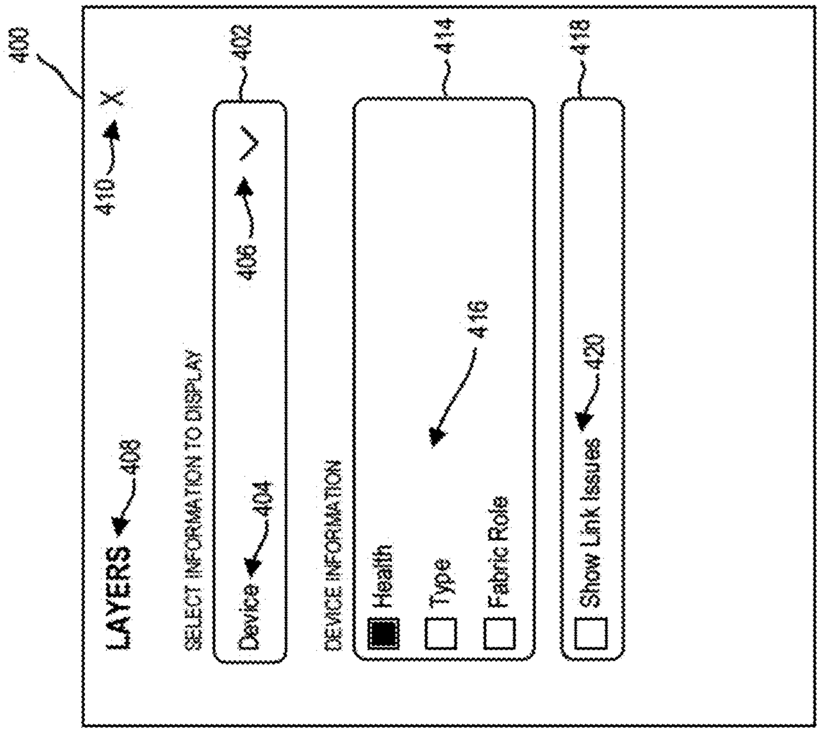

FIG. 4C illustrates an example state of layer selection window 400 in response to selection of the "Device" primary layer option from options list 412. In the state shown in FIG. 4C, primary layer selection input field 402 has transitioned from the open state of FIG. 4B to a closed state, and control 406 has returned to an orientation indicating that primary layer selection input field 402 can be opened by selecting control 406. Additionally, rather than indicating "Select," indicator 404 now indicates the selection made from options list 412 ("Device" in this example).

In the example of FIG. 4C, layer selection window 400 includes a secondary layer selection input field 414. Secondary layer selection input field 414 includes options list 416. Options list 416 may list secondary layer options for selection by a user. These secondary layer options may include sub-level information layers that may be selected for display as part of network management GUI 136, such as part of sunburst diagram 300 of FIG. 3. In the illustrated example options list 416 includes three selectable options that are sub-options of the Device level. Those three sub-options are "Health," "Type," and "Fabric Role." Each selectable sub-option includes a selection box and associated text (e.g., the name of the information layer) positioned adjacent to the selection box. In the illustrated example, the sub-option "Health" has been selected, as shown by the filled-in box adjacent the Health option. Additionally, a link layer selection field 418 may be displayed, allowing selection of an option to show link issues in network management GUI 136, such is in network connectivity path indicator 312.

FIG. 4D illustrates an example state of layer selection window 400 in response to selection of the "Network" primary layer option from options list 412. In the state shown in FIG. 4D, primary layer selection input field 402 has transitioned from the open state of FIG. 4B to a closed state, and control 406 has returned to an orientation indicating that primary layer selection input field 402 can be opened by selecting control 406. Additionally, rather than indicating "Select," indicator 404 now indicates the selection made from options list 412 ("Network" in this example).

In the example of FIG. 4D, layer selection window 400 again includes a secondary layer selection input field 414. Secondary layer selection input field 414 includes options list 416. Options list 416 may list secondary layer options for selection by a user. These secondary layer options may include sub-level information layers that may be selected for display as part of network management GUI 136, such as part of sunburst diagram 300 of FIG. 3. In the illustrated example options list 416 includes four selectable options that are sub-options of the Network level. Those four sub-options are "VLAN," "STP Domain," "OSPF," and "BGP." Each selectable sub-option includes a selection box and associated text (e.g., the name of the information layer) positioned adjacent to the selection box. In the illustrated example, the sub-option "VLAN" has been selected, as shown by the filled-in box adjacent the VLAN option. Additionally, in the illustrated example, layer selection window 400 includes a sub-level detail field 422, which may provide additional information for the selected sub-level. In the illustrate example, sub-level detail field 422 indicates that the VLAN currently supports 4004 employees. A link layer selection field 418 may be displayed, allowing selection of an option to show link issues in network management GUI 136, such as in network connectivity path indicator 312.

Regardless of which option/sub-option has been selected (e.g., "Device" or "Network" and associated sub-options), in certain implementations, in response to detecting selection of a particular option from options list 416, GUI generation engine 130 may update network management GUI 136 (e.g., sunburst diagram 300) to reflect indicators according to the network information 128 corresponding to the selected option, and may cause an appropriate legend 322 to be displayed in network management GUI 136. Additionally, regardless of which option/sub-option has been selected, in certain implementations, in response to detecting selection of link layer selection field 418, GUI generation engine 130 may update network management GUI 136 (e.g., network connectivity path indicator 312) to reflect indicators according to the network information 128 corresponding to link issues.

It should be understood that the particular format and contents of layer selection window 400 is provided as an example only. This disclosure contemplates any suitable format and contents. Additionally, although particular information layers are shown and described, this disclosure contemplates inclusion of any suitable information layers.

Figure 5A:
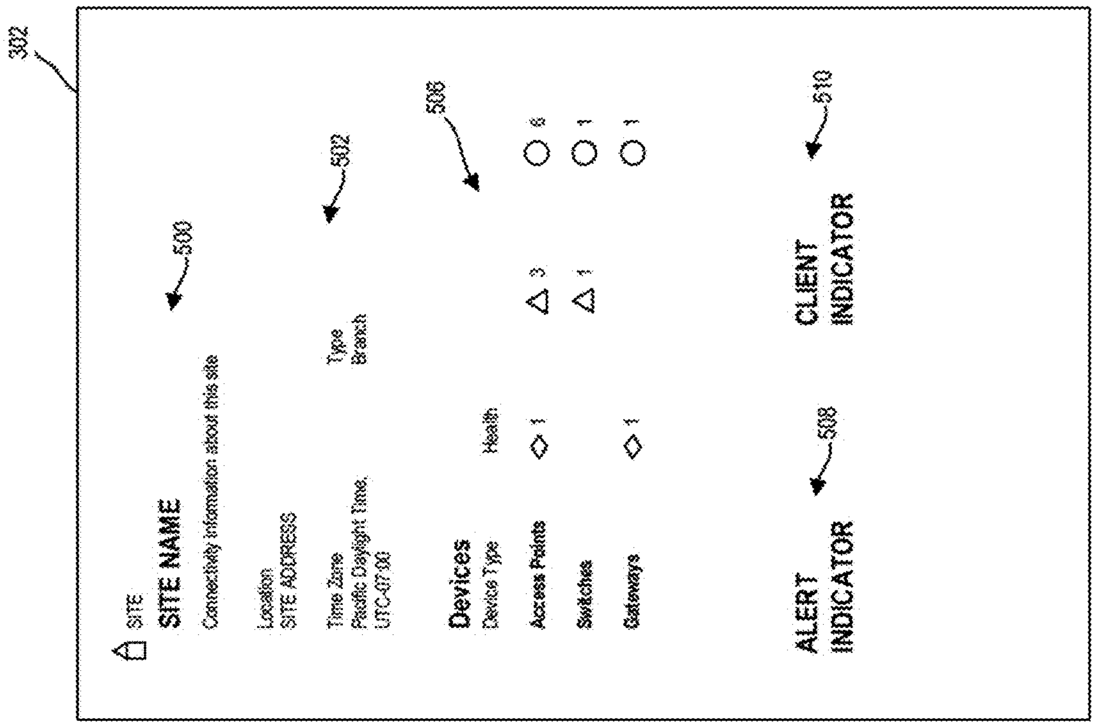
FIGS. 5A-5B illustrate example network information area at various states of interaction, according to certain implementations.
Figure 5B:
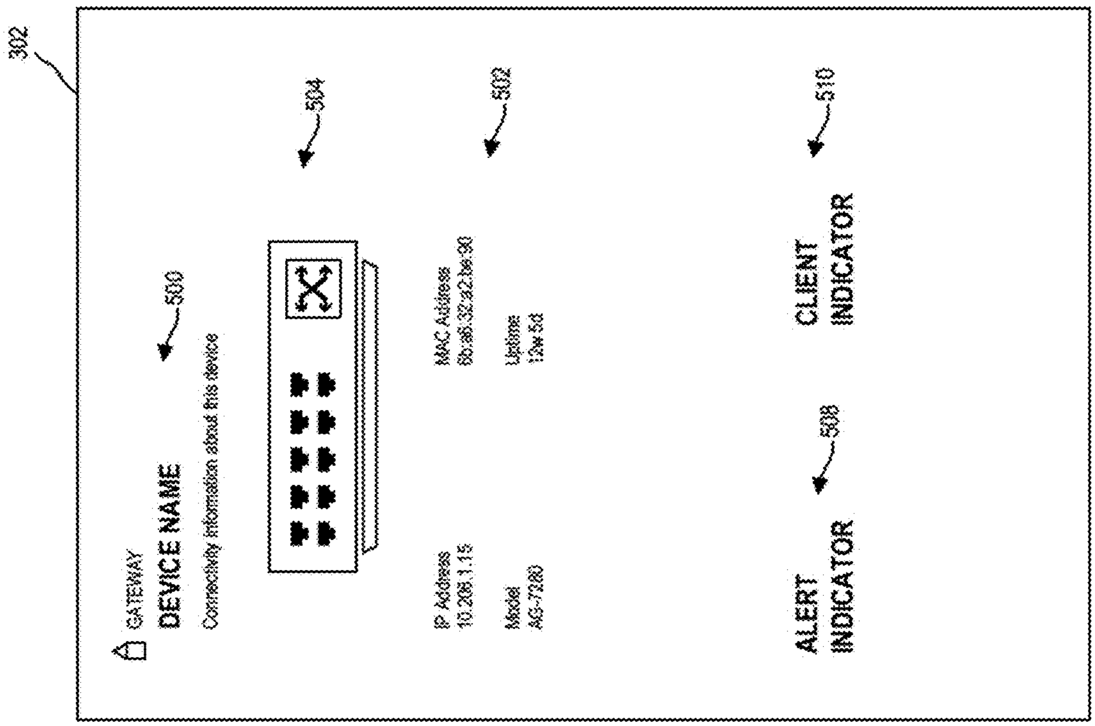

FIGS. 5A-5B illustrate example network information area 302 at various states of interaction, according to certain implementations. In particular, FIG. 5A illustrates an example of network information area 302 at a state in which a center region of the sunburst diagram (e.g., center region 304 of sunburst diagram 300 of FIGS. 3A-3C) corresponds to a hierarchical level 202 of "site" (and a "site" node) of a hierarchical arrangement of a managed communication network (e.g., managed communication network 102 of FIG. 1). FIG. 5B illustrates an example of network information area 302 at a state in which a center region of the sunburst diagram (e.g., center region 304 of sunburst diagram 300 of FIGS. 3A-3C) corresponds to a particular network device (e.g., network device 110 of FIG. 1) in the hierarchical arrangement of a managed communication network (e.g., managed communication network 102 of FIG. 1).

As illustrated in FIG. 5A, network information area 302 includes context information 500. Context information 500 may include an indication of the node within the hierarchical arrangement of a managed communication network that corresponds to center region 304 of sunburst diagram 300. For example, context information 500 indicates that, at the state illustrated in FIG. 5A, network information area 302 provides information for a site and provides an identifier of the site (e.g., SITE NAME), along with explanatory text (e.g., "Connectivity information about this site"). Network information area 302 may include context details 502, which in the case of a site may include physical site address and other associated information about the site.

Continuing with the example of FIG. 5A, network information area 302 may include a site summary 506 that provides information about the network devices 110 at the site. In the illustrated example, site summary 506 includes a summary of the types of network devices 110 (e.g., access points, switches, gateways, etc.) present at the site, along with certain information about those network devices 110. The information about those network devices 110 could correspond, for example, to the current selected information layer for sunburst diagram 300 (e.g., as selected via layer selection icon 320). In certain implementations, the information could be presented in a manner that generally follows legend 322 so that the associated information layer is consistently presented in network information area 302 and sunburst diagram 300.

Alert indicator 508 and client indicator 510 may provide any suitable information related to the current context (e.g., site in FIG. 5A). For example, alert indicator 508 may summarize a count of the number of alerts in one or more categories for devices that are dependents of the current context (e.g., site in FIG. 5A). As another example, client indicator 510 may summarize a count of the number of devices in one or more categories associated with the selected information layer for sunburst diagram 300 (e.g., as selected via layer selection icon 320). In certain implementations, the information could be presented in a manner that generally follows legend 322 so that the associated information layer is consistently presented in network information area 302 and sunburst diagram 300.

As illustrated in FIG. 5B, network information area 302 includes context information 500. Context information 500 may include an indication of the node within the hierarchical arrangement of a managed communication network that corresponds to center region 304 of sunburst diagram 300. For example, context information 500 indicates that, at the state illustrated in FIG. 5B, network information area 302 provides information for a particular network device 110 and provides an identifier of the network device 110 (e.g., DEVICE NAME), along with explanatory text (e.g., "Connectivity information about this device"). In the illustrated example, network information 302 includes a graphic 504 representing the network device 110. Network information area 302 may include context details 502, which in the case of a network device 110 may include an IP address, a MAC address, a model of the device, and certain performance information (e.g., uptime).

Alert indicator 508 and client indicator 510 may provide any suitable information related to the current context (e.g., DEVICE NAME in FIG. 5B). For example, alert indicator 508 may summarize a count of the number of alerts in one or more categories for devices that are dependents of the current context (e.g., DEVICE NAME in FIG. 5B). As another example, client indicator 510 may summarize a count of the number of devices in one or more categories associated with the selected information layer for sunburst diagram 300 (e.g., as selected via layer selection icon 320). In certain implementations, the information could be presented in a manner that generally follows legend 322 so that the associated information layer is consistently presented in network information area 302 and sunburst diagram 300.

FIGS. 6A-6B illustrate an example center region 600 of a sunburst diagram in greater detail, according to certain implementations. In particular, FIG. 6A illustrates an example center region 600*a*, and FIG. 6B illustrates an example center region 600*b*, though center regions 600*a* and 600*b* may be referred to collectively as center regions 600. Additional potential details of the sunburst diagram, such as one or more rings, are omitted for purposes of illustrating in greater detail features of example center regions 600.

As illustrated in FIG. 6A, center region 600*a* includes an opening 602 and a network connectivity path indicator 604 extending through opening 602. Center region 600*a*, opening 602, and network connectivity path indicator 604 may be examples of center region 304, opening 314, and network connectivity path indicator 312 of FIGS. 3A-3C, respectively. As described above with respect to FIGS. 3A-3C, center region 600*a* may correspond to a particular node of the hierarchical arrangement of a communication network (e.g., managed communication network 102 of FIG. 1), and may include information related to the particular node. For example, center region 600*a* may include information related to the particular node, which could be a site, network device 110, and/or other suitable node of the hierarchical arrangement of managed communication network 102.

In the illustrated example, center region 600*a* includes a node icon 606 that corresponds to the node of the hierarchical arrangement that currently corresponds to center region 600*a*. Network connectivity path indicator 604 may incorporate node icon 606 and may show the network path from the node (e.g., network device 110) that corresponds to node icon 606 to another network location, such as the Internet in the illustrated location. In certain implementations, network connectivity path indicator 604 includes one or more status indicators 605 to show the relative statuses of devices included in network connectivity path indicator 604. The status indicators 605 may be shaded or otherwise marked according to the same status that would be used to show device health. Center region 600*a* may include node details 608, which may include an identifier (e.g., an identifier of a network device 110 that currently corresponds to center region 600*a*, such as DEVICE NAME in the illustrated example), an operating status of the identified network device (e.g., Online-Good Performance in the illustrated example), and a connected device count (e.g., 7 connected devices in the illustrated example).

Center region 600*a* may include one or more navigational elements to assist with navigating the network visualization 138 (e.g., sunburst diagram 300) that incorporates center region 600*a*. For example, center region 600*a* may include a back arrow 610 that may be selected to navigate up one hierarchical level of the hierarchical arrangement of a communication network (e.g., of managed communication network 102 of FIG. 1). Considering the example of FIGS. 3A-3B, after navigating to the state of sunburst diagram 300 illustrated in FIG. 3B, back arrow 610 may be used to return to the state of sunburst diagram 300 illustrated in FIG. 3A. As another example, center region 600*a* may include a default view icon 612, which may be selected to navigate to a default view of the network visualization 138 (e.g., sunburst diagram 300) that incorporates center region 600*a*. For example, default view icon 612 may be used to navigate to a default site view of a managed communication network.

Turning to FIG. 6B, FIG. 6B illustrates an example center region 600*b* that omits opening 602 and network connectivity path indicator 604 of FIG. 6A, and instead completely surrounds the information included in center region 600*b*. In certain implementations, center region 600*b* is otherwise analogous to center region 600*a*.

FIGS. 7-10 illustrate various example methods according to certain embodiments of this disclosure. In certain implementations, some or all of the operations associated with the methods of FIGS. 7-10 are performed by network management system 104 or an entity associated with network management system 104. For example, some or all of the operations associated with the methods of FIGS. 7-10 may be performed by network management engine 126 and/or GUI generation engine 130. Furthermore, the methods of FIGS. 7-10 are described using the examples of the preceding figures, but this disclosure is not limited to such embodiments.

Figure 7:
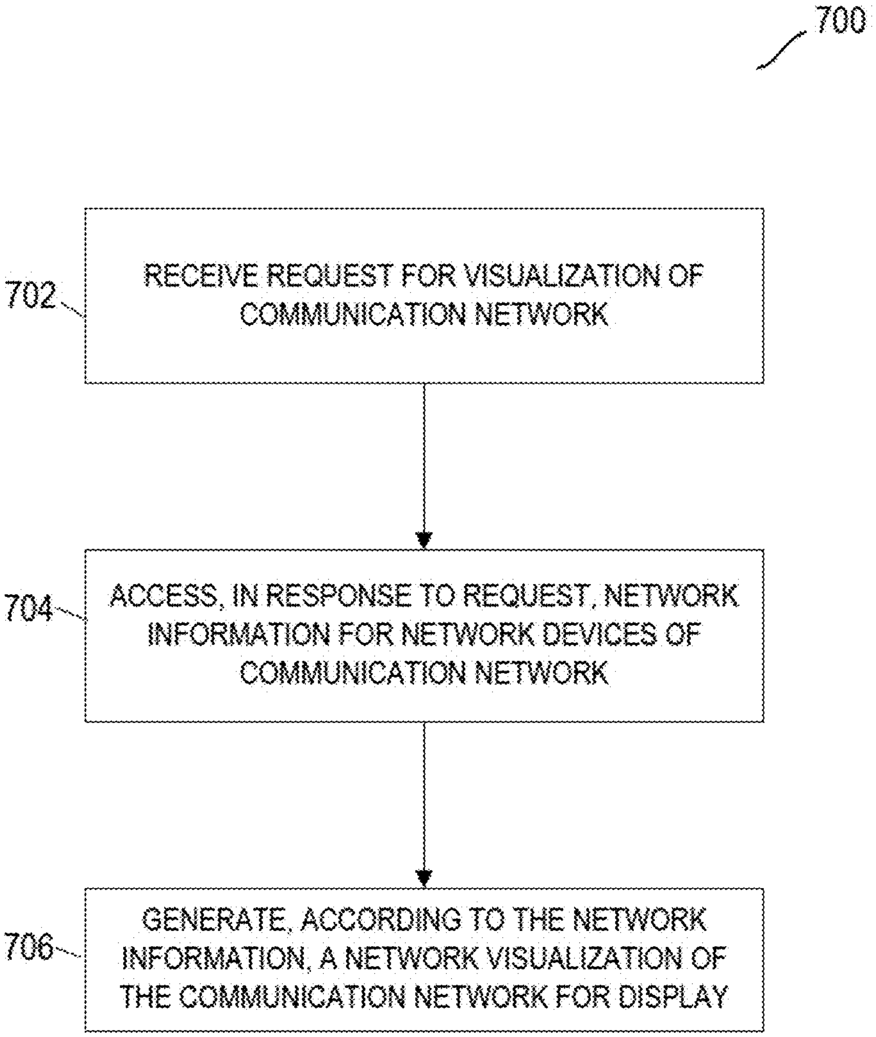
FIG. 7 illustrates an example method for communication network visualization and navigation, according to certain implementations.

FIG. 7 illustrates an example method 700 for communication network visualization and navigation, according to certain implementations. At step 702, GUI generation engine 130 may receive a request for a visualization of a communication network that includes network devices in a hierarchical arrangement having multiple hierarchical levels (e.g., managed communication network 102, network devices 110, hierarchy 200, and hierarchical levels 202). The network devices 110 of managed communication network 102 may include one or more network gateways, one or more network controllers, one or more access points, one or more user devices, and/or any other suitable network devices.

At step 704, GUI generation engine 130 may access, in response to the request, network information 128 for network devices 110. For example, GUI generation engine 130 may access network information 128 based on the request for a network visualization 138 of managed communication network 102. In certain implementations, network information 128 includes information regarding the hierarchical arrangement of network devices 110, information regarding an operational status of network devices 110, information regarding managed communication network 102, and/or any other suitable information.

At step 706, GUI generation engine 130 may generate, according to network information 128, network visualization 138 of managed communication network 102 for display. Generating network visualization 138 may include rendering network visualization 138, displaying network visualization 138, and/or any suitable actions. In certain implementations, network visualization 138 is part of a network management GUI 136, and GUI generation engine 130 is configured to generate network management GUI 136, either as part of or separate from generating network visualization 138.

Network visualization 138 may be a sunburst diagram 300 and may include a center region 304 and one or more rings 306 arranged in a concentric manner and extending radially from center region 304. Each ring 306 at least partially surrounds center region 304 and includes one or more ring segments 308 that each represents a respective network device 110 of managed communication network 102. Center region 304 and each ring 306 may correspond to a respective hierarchical level of the hierarchical arrangement of the network devices of managed communication network 102. In certain implementations, adjacent rings 306 represent adjacent hierarchical levels of the hierarchical arrangement, rings 306 that are closer to center region 304 correspond to hierarchical levels of the hierarchical arrangement that are closer to a root of the hierarchical arrangement than hierarchical levels of rings 306 that are farther from center region 304. In certain implementations, one or more rings 306 of network visualization 138 may be discontinuous. Sunburst diagram 300 of FIGS. 3A-3B illustrate examples of network visualization 138 that may be generated by GUI generation engine 130 at step 706.

In certain implementations, network information 128 includes information corresponding to multiple network information layers, and each ring 306 includes shading to indicate information about managed communication network 102 according to network information 128 for a particular network information layer. In certain implementations, the shading is particular to each ring segment 308 of each ring 306. As described above, shading may include a color fill, a pattern fill, or any other suitable type of shading. Additionally, although shading is described, any other suitable type of indicator may represent the information for the selected network information layer.

Figure 8:
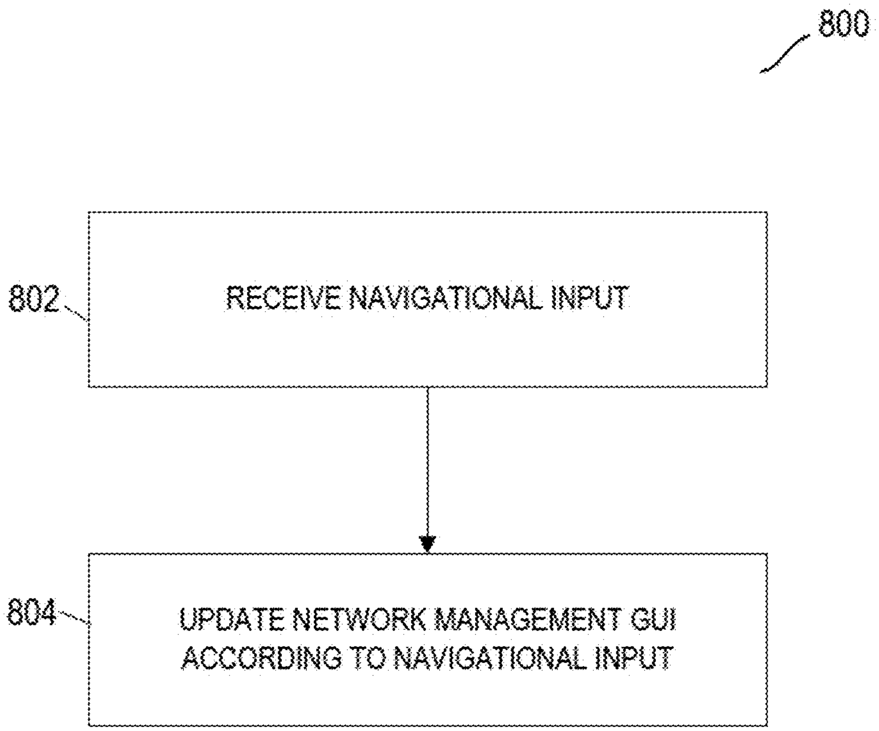
FIG. 8 illustrates an example method for communication network visualization and navigation, according to certain implementations.

FIG. 8 illustrates an example method 800 for communication network visualization and navigation, according to certain implementations. At step 802, GUI generation engine 130 may receive navigational input via network management GUI 136. The navigational input could be a selection of a particular ring segment 308 of network visualization 138 (e.g., sunburst diagram 300), a selection of layer selection icon 320 to view layer selection options; a selection of an information layer via layer selection window 400, a selection of a view adjustment control 324, a search input, or any other suitable navigational input.

At step 804, GUI generation engine 130 may update network management GUI 136 according to the navigational input. Depending on the nature of the navigational input, in certain scenarios, updating network management GUI 136 may include regenerating or otherwise updating network visualization 138 (e.g., sunburst diagram 300) according to the navigational input.

Figure 9:
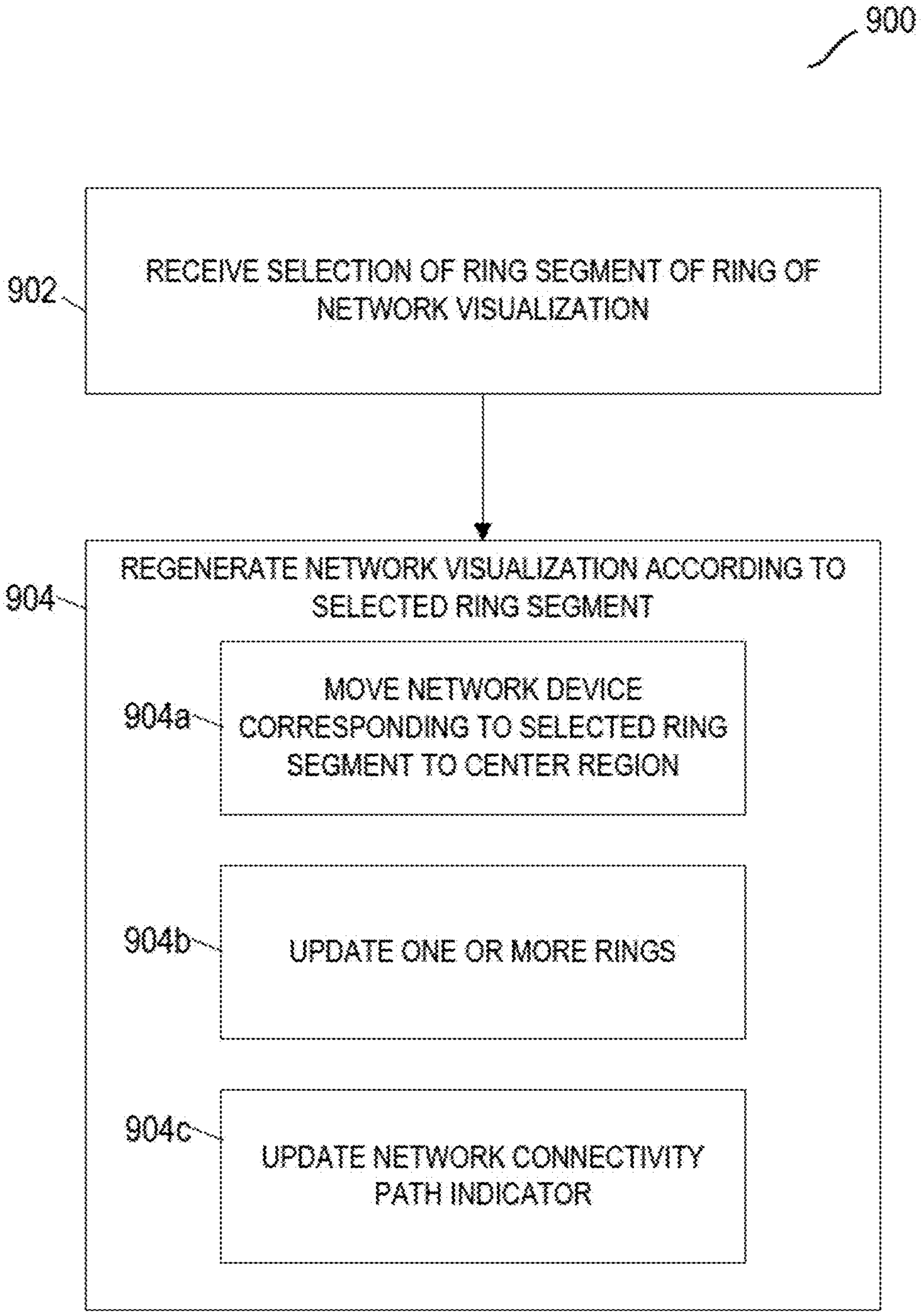
FIG. 9 illustrates an example method for communication network visualization and navigation, according to certain implementations.

FIG. 9 illustrates an example method 900 for communication network visualization and navigation, according to certain implementations. In certain implementations, method 900 is an example of method 800 in which the navigational input received at step 802 is a selection of a particular ring segment 308 of a network visualization 138 (e.g., a particular ring segment 308 of sunburst diagram 300) and GUI generation engine 130 regenerates network visualization 138 (e.g., sunburst diagram 300) according to the selected particular ring segment 308.

At step 902, GUI generation engine 130 may receive a selection of a particular ring segment 308 of a network visualization 138 (e.g., a particular ring segment 308 of sunburst diagram 300). For example, GUI generation engine 130 may receive a selection of a particular ring segment 308 of a network visualization 138 (e.g., a particular ring segment 308 of sunburst diagram 300) via network management GUI 136.

At step 904, GUI generation engine 130 may regenerate network visualization 138 (e.g., sunburst diagram 300) according to the selected ring segment 308. This disclosure contemplates any suitable technique for GUI generation engine 130 to regenerate network visualization 138. Steps 904*a* through 904*c* illustrate an example technique for GUI generation engine 130 to regenerate network visualization 138. A particular example of regenerating network visualization 138 according to a selected ring segment 308 is shown in and described above in reference to FIGS. 3A and 3B, where sunburst diagram 300 is regenerated to the state shown in FIG. 3B in response to the selection of a particular ring segment 308*w* of sunburst diagram 300 from FIG. 3A.

At step 904*a*, regenerating network visualization 138 (e.g., sunburst diagram 300) may include moving the network device 110 that corresponds to the selected ring segment (e.g., selected ring segment 308 of sunburst diagram 300) of step 904 to the center region of the network visualization 138 (e.g., center region 304 of sunburst diagram 300).

At step 904*b*, regenerating network visualization 138 (e.g., sunburst diagram 300) may include updating one or more rings of network visualization 138 (e.g., one or more rings 306 of sunburst diagram 300) according to the selection of the ring segment of network visualization 138 (e.g., the selection of a particular ring segment 308 of sunburst diagram 300). With the update to the center region of step 904*b*, rings 306 of network visualization 138 may be updated to include ring segments 308 that correspond to network devices 110 that are descendants of the network device that now corresponds to center region 304 and omit ring segments 308 that do not correspond to network devices 110 that are descendants of the network device 110 that now corresponds to center region 304. As described above with reference to FIGS. 3A-3B, the number of remaining rings 306 may correspond to the number of hierarchical levels under the hierarchical level of the selected network device 110 that include a descendant of the selected network device 110. In certain implementations, within each remaining ring 306, if any, the remaining ring segments 308 (e.g., that correspond to network devices 110 that are descendants of the network device 110 of the selected ring segment 308) may be redistributed around the updated center region 304, as appropriate.

In certain implementations, a regenerated network visualization 138 (e.g., sunburst diagram 300) may continue to display network information related to a selected network information layer, if any. For example, if a network information layer has previously been selected for display of suitable information in network visualization 138, then the regenerated network visualization 138 may continue to display suitable network information for the remaining ring segments 308 (and corresponding network devices 110) shown.

At step 904*c*, regenerating network visualization 138 (e.g., sunburst diagram 300) may include updating the network connectivity path indicator (e.g., network connectivity path indicator 312 of sunburst diagram 300) according to the selection of the ring segment of network visualization 138 (e.g., the selection of a particular ring segment 308 of sunburst diagram 300). Additional details are shown in and described with reference to FIGS. 3A-3C and 6A.

Figure 10:
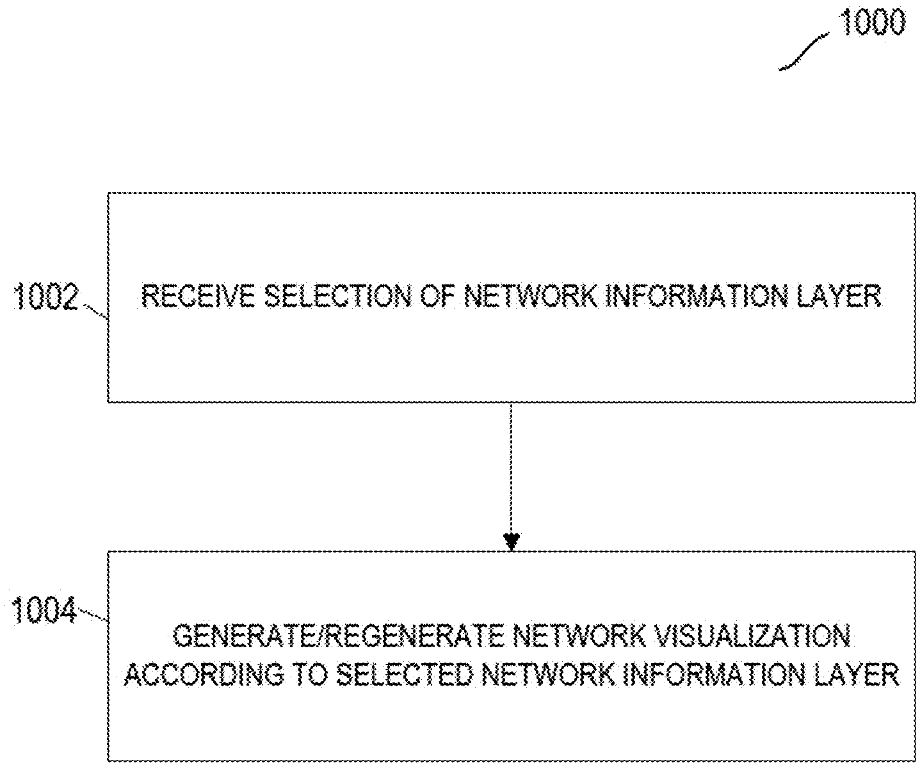
FIG. 10 illustrates an example method for communication network visualization and navigation, according to certain implementations.

FIG. 10 illustrates an example method 1000 for communication network visualization and navigation, according to certain implementations. In certain implementations, method 1000 is an example of method 800 in which the navigational input received at step 802 is a selection of a particular network information layer and GUI generation engine 130 regenerates network visualization 138 (e.g., sunburst diagram 300) according to the selected network information layer.

At step 1002, GUI generation engine 130 may receive a selection of a particular network information layer. For example, GUI generation engine 130 may receive a selection of a particular network information layer via layer selection icon 320 and one or more layer selection windows 400. This could be the first network information layer selected or a new selection of a network information layer.

At step 1004, GUI generation engine 130 may generate or regenerate network visualization 138 (e.g., sunburst diagram 300) according to the selected network information layer. For example, if this is an initial display of the network visualization 138 (e.g., sunburst diagram 300), GUI generation engine 130 may generate network visualization 138 to include information for a preselected and/or default network information layer. As another example, if an instance of network visualization 138 (e.g., sunburst diagram 300) already is displayed in network management GUI 136, then GUI generation engine 130 may regenerate network visualization 138 to either include initial information (if none was included before) or include different information (if different information corresponding to a different network information layer) according to the selected network information layer. This disclosure contemplates any suitable technique for GUI generation engine 130 to regenerate network visualization 138. A particular example of regenerating network visualization 138 according to a selected network information layer is shown in and described above in reference to FIGS. 3A and 3C, where sunburst diagram 300 is regenerated to the state shown in FIG. 3C in response to the selection of a particular network information layer.

In certain implementations, to generate/regenerate network visualization 138 according to the selected network information layer, GUI generation engine 130 may access network information 128 based on the selected network information layer and generate/regenerate network visualization 138 to include information for the selected network information layer. GUI generation engine 130 may access one or more rules to determine what types of indicators (e.g., shading) to include in network visualization 138 to reflect the selected network information layer. In certain implementations, GUI generation engine may apply one or more rules based on the accessed network information 128 to determine which indicator to apply for a network information layer (e.g., an indicator for Good, Fair, or Poor). In certain implementations, the appropriate category for a particular network device 110 for a particular network information layer may be determined by another aspect of a network management system, and GUI generation engine 130 may access the information maintained by the other aspect of the network management system to determine what information to display for each device (e.g., in each ring segment) in network visualization 138.

Figure 11:
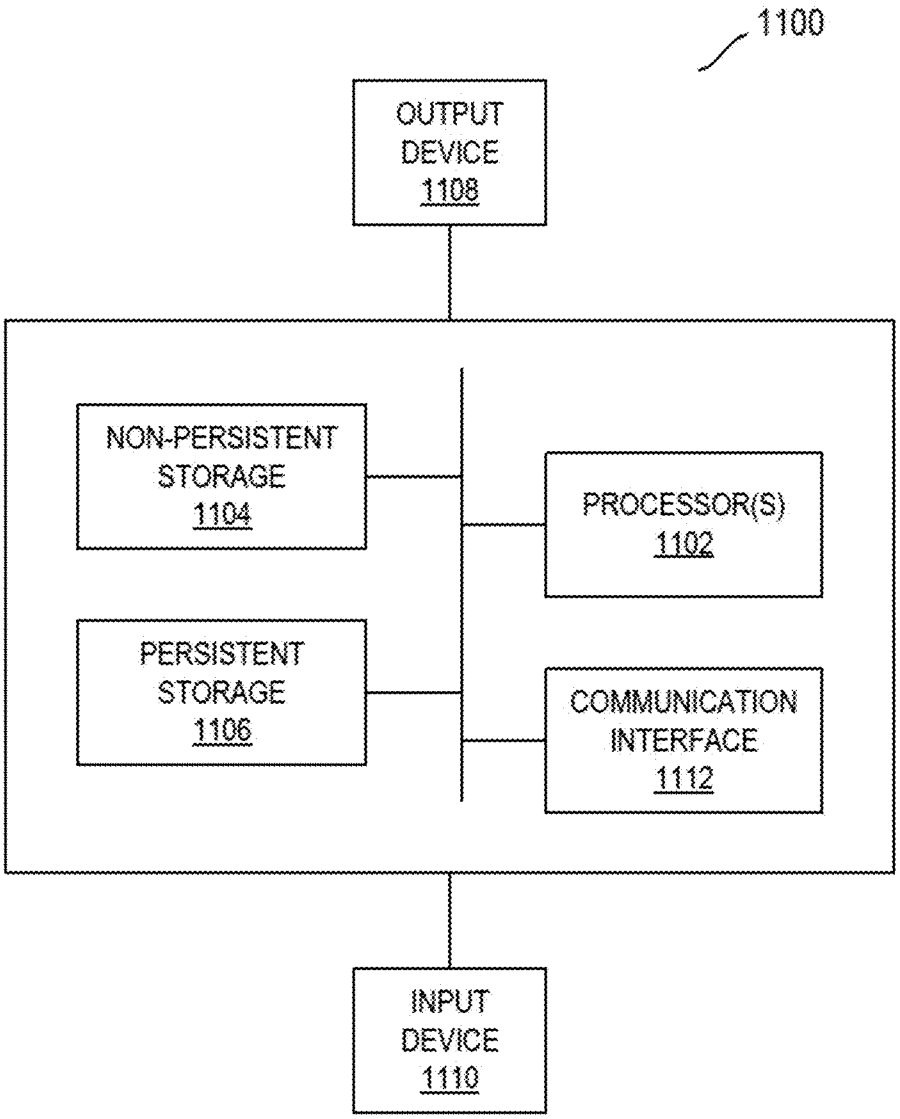
FIG. 11 illustrates a block diagram of an example computer system, according to certain implementations.

FIG. 11 illustrates a block diagram of an example computing device 1100, according to certain implementations. As discussed above, implementations of this disclosure may be implemented using computing devices. For example, all or any portion of the components or methods shown in FIGS. 1-10 (e.g., system 100, managed communication network 102, network management system 104, network devices 110, and methods 700 through 1000) may be implemented, at least in part, using one or more computing devices such as computing device 1100.

Computing device 1100 may include one or more computer processors 1102, non-persistent storage 1104 (e.g., volatile memory, such as RAM, cache memory, etc.), persistent storage 1106 (e.g., a hard disk, an optical drive such as a compact disk (CD) drive or digital versatile disk (DVD) drive, a flash memory, etc.), a communication interface 1112 (e.g., Bluetooth interface, infrared interface, network interface, optical interface, etc.), input devices 1110, output devices 1108, and numerous other elements and functionalities. Each of these components is described below.

In certain implementations, computer processor(s) 1102 may be an integrated circuit for processing instructions. For example, computer processor(s) may be one or more cores or micro-cores of a processor. Processor 1102 may be a general-purpose processor configured to execute program code included in software executing on computing device 1100. Processor 1102 may be a special purpose processor where certain instructions are incorporated into the processor design. Although only one processor 1102 is shown in FIG. 11, computing device 1100 may include any number of processors.

Computing device 1100 may also include one or more input devices 1110, such as a touchscreen, keyboard, mouse, microphone, touchpad, electronic pen, motion sensor, or any other type of input device. Input devices 1110 may allow a user to interact with computing device 1100. In certain implementations, computing device 1100 may include one or more output devices 1108, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) 1102, non-persistent storage 1104, and persistent storage 1106. Many different types of computing devices exist, and the aforementioned input and output device(s) may take other forms. In some instances, multimodal systems can allow a user to provide multiple types of input/output to communicate with computing device 1100.

Further, communication interface 1112 may facilitate connecting computing device 1100 to a network (e.g., a LAN, WAN) such as the Internet, mobile network, or any other type of network) and/or to another device, such as another computing device. Communication interface 1112 may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a Bluetooth® Low Energy (BLE) wireless signal transfer, an IBEACON® wireless signal transfer, a radio frequency identifier (RFID) wireless signal transfer, near-field communications (NFC) wireless signal transfer, dedicated short range communication (DSRC) wireless signal transfer, 802.11 Wi-Fi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1112 may also include one or more Global Navigation Satellite System (GNSS) receivers or transceivers that are used to determine a location of the computing device 1100 based on receipt of one or more signals from one or more satellites associated with one or more GNSS systems. GNSS systems include, but are not limited to, the US-based global positioning system (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

All or any portion of the components of computing device 1100 may be implemented in circuitry. For example, the components can include and/or be implemented using electronic circuits or other electronic hardware, which can include one or more programmable electronic circuits (e.g., microprocessors, graphics processing units (GPUs), digital signal processors (DSPs), CPUs, and/or other suitable electronic circuits), and/or can include and/or be implemented using computer software, firmware, or any combination thereof, to perform the various described operations. In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Certain implementations may provide none, some, or all of the following technical advantages. These and other potential technical advantages may be described elsewhere in this disclosure, or may otherwise be readily apparent to those skilled in the art based on this disclosure.

Certain implementations may provide one or more technical advantages. Certain implementations provide a visualization of a potentially large network infrastructure that uses a limited display area more efficiently. Certain implementations provide a zoomable sunburst diagram for representing and navigating a network infrastructure. Certain implementations maximize and optimize screen space to see an at-a-glance view of many (and possibly all) network devices in the communication network. Certain implementations assist a network administrator (or other user) to intuitively find the cause of a network issue, as an entire affected area of the communication network may be highlighted in the sunburst diagram. Certain implementations help a network administrator (or other user) to efficiently navigate to a specific network device, potentially bypassing one or more hierarchical levels in the network hierarchy, if appropriate. Certain implementations may provide better information density to show different aspects of a communication network by coloring (or otherwise distinguishing) network devices and/or using optional information layers. Some or all of these advantages may help a network administrator (or other user) more efficiently manage the represented communication network, including potentially troubleshoot problems associated with the communication network, which may improve operation of the communication network.

It should be understood that the systems and methods described in this disclosure may be combined in any suitable manner.

Although this disclosure describes or illustrates particular operations as occurring in a particular order, this disclosure contemplates the operations occurring in any suitable order. Moreover, this disclosure contemplates any suitable operations being repeated one or more times in any suitable order. Although this disclosure describes or illustrates particular operations as occurring in sequence, this disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

While this disclosure has been described with reference to illustrative implementations, this description is not intended to be construed in a limiting sense. Various modifications and combinations of the illustrative implementations, as well as other implementations of the disclosure, will be apparent to persons skilled in the art upon reference to the description. It is therefore intended that the appended claims encompass any such modifications or implementations.

What is claimed is:

1. A computer system, comprising:

one or more processors; and one or more non-transitory computer-readable storage media storing programming for execution by the one or more processors, the programming comprising instructions to:

receive a request for a visualization of a communication network, the communication network comprising a plurality of network devices in a hierarchical arrangement that comprises a plurality of hierarchical levels;

access, in response to the request, network information for the plurality of network devices; and generate, according to the network information, a network visualization of the communication network for display, the network visualization comprising:

a center region; and a plurality of rings arranged in a concentric manner and extending radially from the center region, the center region corresponding to a first hierarchical level of the plurality of hierarchical levels, the rings of the plurality of rings corresponding to respective hierarchical levels of the plurality of hierarchical levels, the respective hierarchical levels extending deeper into the hierarchical arrangement radially from the center region, each ring of the plurality of rings at least partially surrounding the center region and comprising one or more ring segments that each represent a respective network device of the plurality of network devices, and for each ring of the plurality of rings, each ring segment of the one or more ring segments corresponds to a respective network device of the plurality of network devices, and wherein the programming further comprises instructions to:

receive a selection of a particular ring segment of the one or more ring segments of a particular ring of the plurality of rings; and regenerate, in response to the selection of the particular ring segment, the network visualization such that the center region is updated to correspond to a particular network device that previously corresponded to the particular ring segment, an inner-most ring comprises one or more ring segments that each correspond to a network device that is a child of the particular network device.

2. The computer system of claim 1, wherein the network information comprises at least one of:

information regarding the hierarchical arrangement of the plurality of network devices;

information regarding an operational status of the plurality of network devices; or information regarding the communication network.

3. The computer system of claim 1, wherein:

the network information comprises information corresponding to a plurality of network information layers; and each ring of the plurality of rings comprises shading to indicate information about the communication network according to the network information corresponding to a first network information layer, the shading being particular to each ring segment of the one or more ring segments of each ring of the plurality of rings.

4. The computer system of claim 3, wherein the programming further comprises instructions to:

receive a selection of a second network information layer of the plurality of network information layers; and regenerate, according to the network information corresponding to the second network information layer, the network visualization for display such that each ring of the plurality of rings comprises shading to indicate information about the communication network for the second network information layer.

5. The computer system of claim 1, wherein the center region and each ring of the plurality of rings correspond to a respective hierarchical level of the plurality of hierarchical levels.

6. The computer system of claim 1, wherein:

adjacent rings of the plurality of rings represent adjacent hierarchical levels of the hierarchical arrangement; and a first ring of the plurality of rings that is closer to the center region than a second ring of the plurality of rings corresponds to a hierarchical level of the hierarchical arrangement that is closer to a root of the hierarchical arrangement than a hierarchical level of the hierarchical arrangement to which the second ring corresponds.

7. The computer system of claim 6, wherein:

the first ring is directly adjacent to the second ring;

a particular ring segment of the first ring corresponds to a first network device that is associated with the first hierarchical level of the hierarchical arrangement; and the second ring comprises one or more ring segments that fall within an angular range of the particular ring segment of the first ring and correspond to respective network devices of the plurality of network devices that are children of the first network device in the hierarchical arrangement.

8. The computer system of claim 1, wherein at least one ring of the plurality of rings is discontinuous.

9. The computer system of claim 1, wherein the network visualization comprises an opening extending from the center region through all of the rings surrounding the center region, a network connectivity path indicator being displayed in the opening.

10. The computer system of claim 1, wherein the programming further comprises instructions to display the network visualization of the communication network.

11. The computer system of claim 1, wherein the programming further comprises instructions to generate a network management graphical user interface (GUI), the network visualization being a part of the network management GUI.

12. A computer-implemented method, comprising:

receiving, by a processing device, a request for a visualization of a communication network, the communication network comprising a plurality of network devices in a hierarchical arrangement that comprises a plurality of hierarchical levels;

accessing, by the processing device in response to the request, network information for the plurality of network devices; and generating, by the processing device according to the network information, a network visualization of the communication network for display, the network visualization comprising:

a center region; and a plurality of rings arranged in a concentric manner and extending radially from the center region, the center region corresponding to a first hierarchical level of the plurality of hierarchical levels, the rings of the plurality of rings corresponding to respective hierarchical levels of the plurality of hierarchical levels, the respective hierarchical levels extending deeper into the hierarchical arrangement radially from the center region, each ring of the plurality of rings at least partially surrounding the center region and comprising one or more ring segments that each represent a respective network device of the plurality of network devices, wherein: for each ring of the plurality of rings, each ring segment of the one or more ring segments corresponds to a respective network device of the plurality of network devices; and the method further comprises:

receiving a selection of a particular ring segment of the one or more ring segments of a particular ring of the plurality of rings; and regenerating, in response to the selection of the particular ring segment, the network visualization such that the center region is updated to correspond to a particular network device that previously corresponded to the particular ring segment, an innermost ring comprises one or more ring segments that each correspond to a network device that is a child of the particular network device.

13. The computer-implemented method of claim 12, wherein each ring of the plurality of rings comprises shading to indicate information about the communication network for a first network information layer, the shading being particular to each ring segment of the one or more ring segments.

14. The computer-implemented method of claim 13, further comprising:

receiving a selection of a second network information layer; and regenerating, according to the network information, the network visualization of the communication network for display such that the plurality of rings comprises shading to indicate information about the communication network for the second network information layer.

15. The computer-implemented method of claim 12, wherein:

adjacent rings of the plurality of rings represent adjacent hierarchical levels of the hierarchical arrangement;

a first ring of the plurality of rings that is closer to the center region than a second ring of the plurality of rings corresponds to a hierarchical level of the hierarchical arrangement that is closer to a root of the hierarchical arrangement than a hierarchical level of the hierarchical arrangement to which the second ring corresponds;

the first ring is directly adjacent to the second ring;

a particular ring segment of the first ring corresponds to a first network device that is associated with the first hierarchical level of the hierarchical arrangement; and the second ring comprises one or more ring segments that fall within an angular range of the particular ring segment of the first ring and correspond to respective network devices of the plurality of network devices that are children of the first network device in the hierarchical arrangement.

16. The computer-implemented method of claim 12, wherein the network visualization comprises an opening extending from the center region through all of the rings surrounding the center region, a network connectivity path indicator being displayed in the opening.

17. The computer-implemented method of claim 12, further comprising generating a network management graphical user interface (GUI), the network visualization being a part of the network management GUI.

18. One or more non-transitory computer-readable storage media storing programming for execution by one or more processors, the programming comprising instructions to:

receive a request for a visualization of a communication network, the communication network comprising a plurality of network devices in a hierarchical arrangement that comprises a plurality of hierarchical levels;

access, in response to the request, network information for the plurality of network devices; and generate, according to the network information, a network visualization of the communication network for display, the network visualization comprising:

a center region; and a plurality of rings arranged in a concentric manner and extending radially from the center region, the center region corresponding to a first hierarchical level of the plurality of hierarchical levels, the rings of the plurality of rings corresponding to respective hierarchical levels of the plurality of hierarchical levels, the respective hierarchical levels extending deeper into the hierarchical arrangement radially from the center region, each ring of the plurality of rings at least partially surrounding the center region and comprising one or more ring segments that each represent a respective network device of the plurality of network devices, for each ring of the plurality of rings, each ring segment of the one or more ring segments corresponds to a respective network device of the plurality of network devices; and the programming further comprises instructions to:

receive a selection of a particular ring segment of the one or more ring segments of a particular ring of the plurality of rings; and regenerate, in response to the selection of the particular ring segment, the network visualization such that the center region is updated to correspond to a particular network device that previously corresponded to the particular ring segment, an inner-most ring comprises one or more ring segments that each correspond to a network device that is a child of the particular network device.

* * * * *